(12) United States Patent
Kusama et al.

(10) Patent No.: US 10,545,267 B2
(45) Date of Patent: Jan. 28, 2020

(54) OPTICAL DIFFUSION FILM AND METHOD FOR MANUFACTURING OPTICAL DIFFUSION FILM

(71) Applicant: LINTEC Corporation, Tokyo (JP)

(72) Inventors: Kentaro Kusama, Itabashi-ku (JP); Baku Katagiri, Itabashi-ku (JP); Kenta Tomioka, Itabashi-ku (JP); Tomoo Orui, Itabashi-ku (JP); Satoru Shoshi, Itabashi-ku (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 16/239,800

(22) Filed: Jan. 4, 2019

(65) Prior Publication Data

US 2019/0179060 A1 Jun. 13, 2019

Related U.S. Application Data

(63) Continuation of application No. 15/513,059, filed as application No. PCT/JP2014/076321 on Oct. 1, 2014, now Pat. No. 10,222,522.

(51) Int. Cl.
G02B 5/02 (2006.01)

(52) U.S. Cl.
CPC ......... *G02B 5/0257* (2013.01); *G02B 5/0236* (2013.01); *G02B 5/0247* (2013.01); *G02B 5/0278* (2013.01)

(58) Field of Classification Search
CPC ............................ G02B 5/0257; G02B 5/0247
USPC ........................................................ 359/599
See application file for complete search history.

(56) References Cited

U.S. PATENT DOCUMENTS

| 6,424,395 | B1 | 7/2002 | Sato et al. |
| 9,519,086 | B2 | 12/2016 | Kusama et al. |
| 2014/0340752 | A1 | 11/2014 | Kusama et al. |
| 2014/0340753 | A1 | 11/2014 | Kusama et al. |
| 2015/0346396 | A1 | 12/2015 | Sugiyama |
| 2015/0355390 | A1 | 12/2015 | Katagiri et al. |
| 2016/0018571 | A1 | 1/2016 | Kusama et al. |

(Continued)

FOREIGN PATENT DOCUMENTS

| JP | 2006323379 A | 11/2006 |
| JP | 2012141593 A | 7/2012 |

(Continued)

*Primary Examiner* — Collin X Beatty
*Assistant Examiner* — Grant A Gagnon
(74) *Attorney, Agent, or Firm* — Renner, Kenner; Arthur M. Reginelli

(57) ABSTRACT

Provided are an optical diffusion film composed of a single layer, for which the optical diffusion incident angle region can be effectively expanded, and even when the incident angle of incident light is varied within the optical diffusion incident angle region, changes in the optical diffusion characteristics can be effectively suppressed; and a method for manufacturing the optical diffusion film.

Disclosed is an optical diffusion film having, inside the film, a single optical diffusion layer having a first internal structure and a second internal structure, each of which include a plurality of regions having a relatively high refractive index in a region having a relatively low refractive index, sequentially from the lower part along the film thickness direction, and the regions having a relatively high refractive index in the first internal structure have a bent section at an intermediate point along the film thickness direction.

10 Claims, 24 Drawing Sheets

(56) References Cited

U.S. PATENT DOCUMENTS

| | | |
|---|---|---|
| 2016/0025907 A1 | 1/2016 | Kusama et al. |
| 2016/0033692 A1 | 2/2016 | Kusama et al. |
| 2016/0047952 A1 | 2/2016 | Kusama et al. |
| 2016/0070035 A1 | 3/2016 | Kusama et al. |
| 2016/0077246 A1 | 3/2016 | Kusama et al. |
| 2017/0293054 A1 | 10/2017 | Kusama et al. |

FOREIGN PATENT DOCUMENTS

| | | |
|---|---|---|
| JP | 2013117702 A | 6/2013 |
| JP | 2013117703 A | 6/2013 |
| JP | 2013148712 A | 8/2013 |
| JP | 2013195672 A | 9/2013 |
| JP | 2013210408 A | 10/2013 |
| JP | 2013210409 A | 10/2013 |
| JP | 2014002186 A | 1/2014 |
| JP | 2014002187 A | 1/2014 |
| JP | 2014002188 A | 1/2014 |
| JP | 2014126749 A | 7/2014 |
| JP | 2014126750 A | 7/2014 |
| JP | 2014126771 A | 7/2014 |
| JP | 2014191340 A | 10/2014 |
| JP | 2016048290 A | 4/2016 |
| WO | 2014084361 A1 | 6/2014 |
| WO | 2013108540 A1 | 5/2015 |

OPTICAL DIFFUSION FILM AND METHOD FOR MANUFACTURING OPTICAL DIFFUSION FILM

This application is a continuation application of U.S. National-Stage application Ser. No. 15/513,059 filed on Mar. 21, 2017, which claims the benefit of PCT/JP2014/076321 filed on Oct. 1, 2014.

BACKGROUND OF THE INVENTION

1. Field of the Invention

The present invention relates to an optical diffusion film and a method for manufacturing an optical diffusion film.

More particularly, the invention relates to an optical diffusion film composed of a single layer, for which the optical diffusion incident angle region can be effectively expanded, and even in a case in which the incident angle of incident light is varied within the optical diffusion incident angle region, changes in the optical diffusion characteristics can be effectively suppressed, and to a method for manufacturing an optical diffusion film.

2. Description of the Related Art

In the field of optical technology to which, for example, liquid crystal display devices and the like belong, optical diffusion films that can diffuse an incident light coming from a particular direction into particular directions, while transmitting straight an incident light coming from any other directions, have been conventionally used.

Various forms of such optical diffusion films are known; however, in particular, optical diffusion films having, within the films, a louver structure in which a plurality of plate-shaped regions having different refractive indices are alternately arranged in one arbitrary direction along the film plane, have been widely used.

Furthermore, regarding optical diffusion films of another type, optical diffusion films having, within the film, a columnar structure in which a plurality of pillar-shaped objects having a relatively high refractive index are arranged to stand close together in a region having a relatively low refractive index, have also been widely used.

However, when an optical diffusion film only has a louver structure having a single inclination angle or a columnar structure within the film, there is a problem that a sufficient optical diffusion incident angle region may not be obtained.

Thus, there has been suggested a technology of expanding the optical diffusion incident angle region by regulating the conditions employed when an internal structure is formed by irradiating a composition for an optical diffusion film with active energy radiation, and thereby curving the entirety of the internal structure in the film thickness direction or providing a bent section in the internal structure (see, for example, JP 2006-323379 Å and JP 2013-195672 Å).

Meanwhile, the term "optical diffusion incident angle region" means the range of the angle of incidence through which diffused light can be emitted when the angle of incidence of incident light coming from a point light source is changed in an optical diffusion film.

Namely, JP 2006-323379 A discloses a method for manufacturing a light control film (optical diffusion film), by which a film-like composition (composition for an optical diffusion film) that contains at least two kinds of compounds each having a polymerizable carbon-carbon bond in the molecule and having mutually different refractive indices, is irradiated with ultraviolet radiation through an interference filter having a transmittance of 0% to 60% to light having a wavelength of 313 nm, and the composition is cured.

Furthermore, as illustrated in FIGS. 21(a) and 21(b), regarding a light control film 207 manufactured by the method described above, a light control film 207 in which the difference ($\alpha_a - \alpha_b$) between the minimum angle of inclination $\alpha_a$ and the maximum angle of inclination $\alpha_b$ in a cross-section of the light control film 207 observed by an optical microscope, has been disclosed.

JP 2013-195672 A discloses an anisotropic optical film (optical diffusion film) 353 having, as illustrated in FIG. 22, at least low refractive index regions (341, 342, and 343) and a high refractive index region 306 inside a single anisotropic diffusion layer 307, the anisotropic optical film having a structure in which at the surface of the single anisotropic diffusion layer 307, the low refractive index regions (341 and 343) and the high refractive index region 306 are alternately aligned; in a cross-section of the single anisotropic diffusion layer 307, the low refractive index regions (341, 342, and 343) and the high refractive index region (306) exist in the form of being bent in the thickness direction; the anisotropic optical film has a first diffusion central axis in the upper part 371 of the single anisotropic diffusion layer 307, and has a second diffusion central axis in the medium part 372 of the single anisotropic diffusion layer; and the gradient of the first diffusion central axis and the gradient of the second diffusion central axis with respect to the normal direction are different.

Furthermore, as a method of forming a bent internal structure, a method of irradiating a photocurable composition layer (layer formed from a composition for an optical diffusion film) with ultraviolet radiation, while applying a temperature distribution in the thickness direction of the photocurable composition layer, has been disclosed.

JP 2013-195672 A also discloses, as illustrated in FIG. 22, an embodiment having a third diffusion central axis in the lower part 373 of the single anisotropic diffusion layer 307, that is, an embodiment having two bent sections in the internal structure.

On the other hand, there has been suggested a technology of irradiating a composition for an optical diffusion film with active energy radiation in two stages, thereby forming two internal structures in sequence from the lower part along the film thickness direction, and expanding the optical diffusion incident angle region (see, for example, JP 2012-141593 A and WO 2013/108540 A).

Namely, JP 2012-141593 A discloses an optical diffusion film 430 having, as illustrated in FIGS. 23(a) and 23(b), a first structural region 410 for anisotropically diffusing incident light, and a second structural region 420 for isotropically diffusing incident light, characterized in that the first structural region 410 is a louver structural region in which a plurality of plate-shaped regions having different refractive indices are alternately arranged in parallel along the film plane direction, and the second structural region is a columnar structural region in which a plurality of pillar-shaped objects are arranged to stand close together in a medium, the pillar-shaped objects having a refractive index different from that of the medium.

Furthermore, WO 2013/108540 A discloses an anisotropic optical diffusion film 540 having, as illustrated in FIGS. 24(a) and 24(b), a first louver structural region 520 and a second louver structural region 530, in each of which a plurality of plate-shaped regions having different refractive indices are alternately arranged in parallel along any one direction along the film plane, sequentially from the lower part along the film thickness direction, characterized in that the anisotropic optical diffusion film 540 has an overlapping louver structural region in which the position of the upper end of the first louver structural region 520 and the position of the lower end of the second louver structural region 530 overlap each other in the film thickness direction.

SUMMARY OF THE INVENTION

However, the optical diffusion film described in JP 2006-323379 A has a problem that the degree of freedom in the control of curvature is low, and it is difficult to sufficiently expand the optical diffusion incident angle region.

Furthermore, there is a problem that stability in the control of curvature is also low, and it is difficult to curve the internal structure stably at a desired angle.

There is also another problem that on the occasion of curving the internal structure, when the composition for an optical diffusion film is irradiated with ultraviolet radiation, a very expensive interference filter such as a band pass filter must be used, and it is economically disadvantageous.

The optical diffusion film described in JP 2013-195672 A also has a problem that the degree of freedom in control of the bent section is low, and it is difficult to sufficiently expand the optical diffusion incident angle region.

The optical diffusion film described in JP 2013-195672 A also has a problem that the degree of freedom in control of the bent section is low, and it is difficult to sufficiently expand the optical diffusion incident angle region.

Also, in JP 2013-195672 A, since a bent section is formed by irradiating a composition for an optical diffusion film with ultraviolet radiation while applying a temperature distribution, there is a problem that stability in the control of the section is very low, and it is difficult to bend the internal structure stably at a desired angle.

Meanwhile, the optical diffusion films described in JP 2012-141593 A and WO 2013/108540 A are configured such that two internal structures are separately formed. Therefore, the degree of freedom in control of the respective angles of inclination of the internal structures is high, and the optical diffusion incident angle region can be expanded to a certain extent.

However, in a case in which the optical diffusion incident angle region is expanded to a predetermined extent, or even more, a phenomenon may occur, in which it is speculated that depending on the incident angle of incident light, the light that has been diffused by the first internal structure may become almost undiffusible by the second internal structure, or the light that could not be diffuse by the first internal structure is diffused only by the second internal structure.

Therefore, despite that the incident angle of incident light is varied within the optical diffusion incident angle region, the optical diffusion characteristics may change.

As a countermeasure for this problem, an embodiment of increasing the region in which the optical diffusion incident angle region provided by the first internal structure overlaps with the optical diffusion incident angle region provided by the second internal structure, may be mentioned. However, in that case, the degree of freedom for the angles of inclination of the internal structures, or the overall optical diffusion incident angle region of the film provided by the two internal structures becomes narrower.

Thus, the inventors of the present invention conducted a thorough investigation in view of such circumstances as described above, and the inventors found that when a bent section is provided at least in a region having a relatively high refractive index, which constitutes a first internal structure, the optical diffusion incident angle region can be effectively expanded, and also, even in a case in which the incident angle of incident light is varied within the optical diffusion incident angle region, changes in the optical diffusion characteristics can be effectively suppressed. Thus, the inventors completed the present invention.

An object of the invention is to provide an optical diffusion film composed of a single layer, for which the optical diffusion incident angle region can be effectively expanded, and even when the incident angle of incident light is varied within the optical diffusion incident angle region, changes in the optical diffusion characteristics can be effectively suppressed; and a method for manufacturing the optical diffusion film.

According to an aspect of the invention, there is provided an optical diffusion film having, inside the film, a single optical diffusion layer having a first internal structure and a second internal structure, each of which includes a plurality of regions having a relatively high refractive index (hereinafter, may be referred to as "high refractive index region") in a region having a relatively low refractive index (hereinafter, may be referred to as "low refractive index region"), sequentially from the lower part along the film thickness direction, in which the regions having a relatively high refractive index in the first internal structure each have a bent section at an intermediate point along the film thickness direction. Thus, the problems described above can be solved.

That is, when the optical diffusion film of the invention is used, since the film has a first internal structure and a second internal structure inside the film, and a bent section is provided at least in the regions having a relatively high refractive index that constitute the first internal structure, two optical diffusion incident angle regions originating from the first internal structure and at least one optical diffusion incident angle region originating from the second internal structure can be stably obtained.

Therefore, when altogether three optical diffusion incident angle regions are superposed while being shifted in an appropriate range, the overall optical diffusion incident angle region of the film can be effectively expanded.

Furthermore, since incident light can be gradually diffused in three stages, compared to a case in which incident light is diffused by diffusion in two stages, even in a case in which the overall optical diffusion incident angle region of the film is expanded to the same extent, the changes in the optical diffusion characteristics associated with variation in the incident angle of incident light can be effectively suppressed.

Furthermore, since the optical diffusion film is composed of a single layer, compared to a case in which a plurality of optical diffusion films are laminated, not only it is economically advantageous because the processes of layer bonding can be reduced, but the occurrence of blurring in displayed images or the occurrence of delamination can also be effectively suppressed.

The term "single layer" means that a plural number of optical diffusion films are not laminated.

The term "intermediate point" means a center point with respect to two edges, as well as any one arbitrary point in the middle between the two edges.

Furthermore, on the occasion of configuring the optical diffusion film of the invention, it is preferable to have an overlapping internal structure in which the position of the upper end of the first internal structure and the position of the lower end of the second internal structure overlap with each other in the film thickness direction.

When the optical diffusion film is configured as such, generation of scattered light can be effectively suppressed, and uniformity of the intensity of diffused light can be enhanced, compared to a case in which a portion where an internal structure is not formed exists between the respective internal structures.

On the occasion of configuring the optical diffusion film of the invention, it is preferable that the overlapping internal structure is an overlapping internal structure in which the tips of the regions having a relatively high refractive index, which originate from any one of the first internal structure and the second internal structure, are in contact with the vicinity of the tips of the regions having a relatively high refractive index, which originate from the other internal structure; or an overlapping internal structure in which the regions having a relatively high refractive index, which respectively originate from the first internal structure and the second internal structure, overlap in a non-contact state.

When the optical diffusion film is configured as such, internal structures can be efficiently disposed within the limited film thickness, generation of scattered light can be more effectively suppressed, and uniformity of the intensity of diffused light can be enhanced.

Furthermore, on the occasion of configuring the optical diffusion film of the invention, it is preferable that the thickness of the overlapping internal structure is adjusted to a value within the range of 1 to 40 μm.

When the optical diffusion film is configured as such, generation of scattered light in the overlapping internal structure can be more effectively suppressed, and uniformity of the intensity of diffused light can be enhanced.

On the occasion of configuring the optical diffusion film of the invention, it is preferable that with regard to the overlapping internal structure, the absolute value of the difference of the angles of inclination of the regions having a relatively high refractive index, which respectively originate from the first internal structure and the second internal structure, is adjusted to a value of 1° or more.

When the optical diffusion film is configured as such, the optical diffusion incident angle region can be more effectively expanded.

On the occasion of configuring the optical diffusion film of the invention, it is preferable that in the first internal structure, the angle of inclination θa, with respect to the normal line of the film plane, of the regions having a relatively high refractive index in the portion upper than the bent section is adjusted to a value within the range of 0° to 30°, and the angle of inclination θb, with respect to the normal line of the film plane, of the regions having a relatively high refractive index in the portion lower than the bent section is adjusted to a value within the range of 1° to 60°.

When the optical diffusion film is configured as such, the optical diffusion incident angle region can be more effectively expanded.

The "portion upper than the bent section" means the portion on the side that is irradiated with active energy radiation when the optical diffusion film is manufactured, with respect to the bent section as a reference, and the "portion lower than the bent section" means the portion on the opposite side with respect to the bent section as a reference.

Furthermore, on the occasion of constituting the optical diffusion film of the invention, it is preferable that in the first internal structure, the length La of the regions having a relatively high refractive index in the portion upper than the bent section is adjusted to a value within the range of 15 to 475 μm, and the length Lb of the regions having a relatively high refractive index in the portion lower than the bent section is adjusted to a value within the range of 15 to 475 μm.

When the optical diffusion film is configured as such, changes in the optical diffusion characteristics associated with variation in the incident angle of incident light can be effectively suppressed, while the optical diffusion incident angle region can be more effectively expanded.

On the occasion of configuring the optical diffusion film of the invention, it is preferable that the first internal structure is a columnar structure in which a plurality of pillar-shaped regions having a relatively high refractive index are arranged to stand close together in the film thickness direction in a region having a relatively low refractive index, or a louver structure in which a plurality of plate-shaped regions having different refractive indices are alternately disposed in one arbitrary direction along the film plane.

When the optical diffusion film is configured as such, a distinct first internal structure having a predetermined difference in refractive index can be formed, and a bent section can be definitely provided in the region having a relatively high refractive index.

Furthermore, on the occasion of configuring the optical diffusion film of the invention, it is preferable that the second internal structure is a columnar structure in which a plurality of pillar-shaped regions having a relatively high refractive index are arranged to stand close together in the film thickness direction in a region having a relatively low refractive index, or a louver structure in which a plurality of plate-shaped regions having different refractive indices are alternately disposed in one arbitrary direction along the film plane.

When the optical diffusion film is configured as such, a distinct second internal structure having a predetermined difference in refractive index can be formed.

According to another aspect of the invention, there is provided a method for manufacturing the optical diffusion film described above, the method including the following steps (a) to (d):

(a) a step of preparing a composition for an optical diffusion film, the composition including at least two polymerizable compounds having different refractive indices, a photopolymerization initiator and an ultraviolet absorber, in which the content of the ultraviolet absorber is adjusted to a value of below 2 parts by weight (provided that 0 parts by weight is excluded) with respect to the total amount (100 parts by weight) of the at least two polymerizable compounds having different refractive indices;

(b) a step of applying the composition for an optical diffusion film on a process sheet, and forming a coating layer;

(c) a step of performing first irradiation of the coating layer with active energy radiation, forming a first internal structure in the lower portion of the coating layer, and also leaving a region where an internal structure is not formed, in the upper portion of the coating layer; and (d) a step of performing second irradiation of the coating layer with active energy radiation, and forming a second internal structure in the region where an internal structure is not formed.

That is, when the method for manufacturing an optical diffusion film of the invention is used, since the composition for an optical diffusion film includes a predetermined amount of an ultraviolet absorber, a bent section can be provided stably in the regions having a relatively high refractive index that constitute the first internal structure, by the first irradiation with active energy radiation.

Furthermore, since a coating layer formed from a predetermined composition for an optical diffusion film is subjected to first and second irradiation with active energy radiation, the combination of the angles of inclination of the regions having a relatively high refractive index in the first and second internal structures can be regulated easily by appropriately regulating the angle of irradiation for the irradiation with active energy radiation.

Also, since the first and second internal structures are formed within a single layer, the occurrence of delamination in the optical diffusion film thus obtained can be fundamentally suppressed.

On the occasion of implementing the method for manufacturing an optical diffusion film of the invention, it is preferable that the first irradiation with active energy radiation is performed in an oxygen-containing atmosphere, and the second irradiation with active energy radiation is performed in a non-oxygen atmosphere.

When the method is carried out as such, the first internal structure can be efficiently formed in the lower portion of the coating layer, while a region where an internal structure is not formed can be caused to stably remain in the upper portion of the coating layer by utilizing the effect of oxygen inhibition.

On the other hand, in the region where an internal structure is not formed, a second internal structure can be efficiently formed by suppressing the effect of oxygen inhibition.

DETAILED DESCRIPTION OF THE PREFERRED EMBODIMENTS

First Embodiment

A first embodiment of the present invention relates to an optical diffusion film having a single optical diffusion layer having a first internal structure and a second internal structure, both of which include a plurality of regions having a relatively high refractive index in a region having a relatively low refractive index, sequentially from the lower part along the film thickness direction, in which the regions having a relatively high refractive index in the first internal structure have a bent section at an intermediate point along the film thickness direction.

Hereinafter, the first embodiment of the invention will be specifically described with appropriate reference to the drawings.

1. Basic Configuration

Figure 1A:
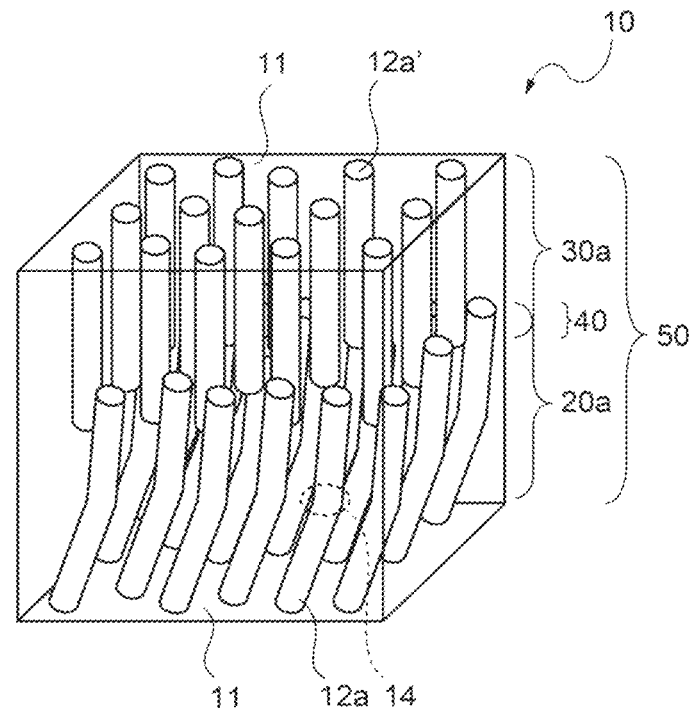
FIGS. 1(a) and 1(b) are diagrams provided to explain the configuration of the optical diffusion film of the invention.
Figure 1B:
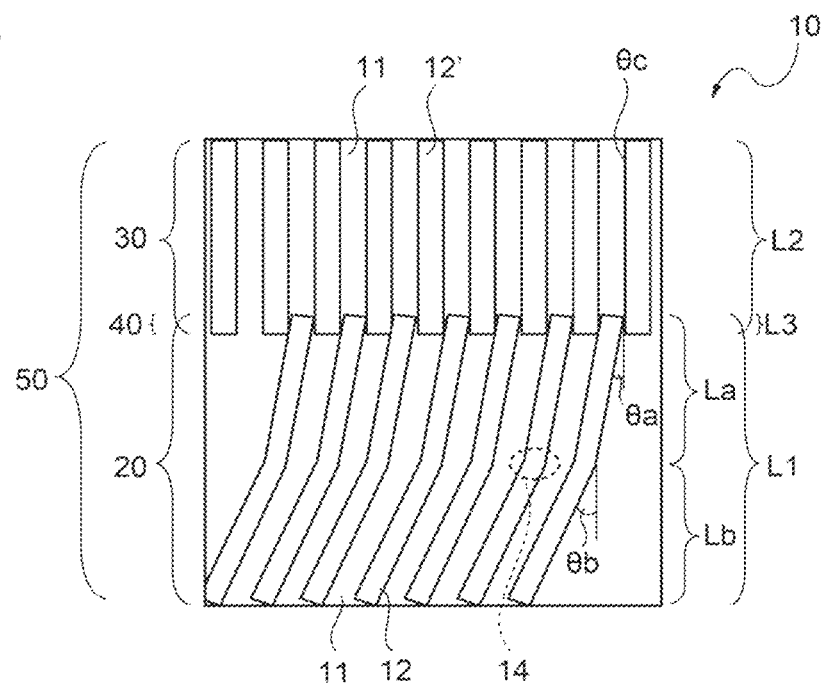

First, the basic configuration of the optical diffusion film 10 of the invention will be specifically described using FIGS. 1(a) and 1(b), by taking a case in which the first internal structure 20 and the second internal structure 30 are both columnar structures (20a and 30a) as an example.

Here, FIG. 1(a) shows a perspective view illustrating the entirety of the optical diffusion film 10, and FIG. 1(b) shows a cross-sectional view of the optical diffusion film 10 of FIG. 1(a).

However, FIG. 1(b) is used as a comprehensive diagram that is not limited to a case in which the first and second internal structures (20, 30) are both columnar structures (20a, 30a), but also includes a case in which, for example, the internal structures are other internal structures such as a louver structure.

As illustrated in such FIGS. 1(a) and 1(b), the optical diffusion film 10 is a film 10 having a single optical diffusion layer 50 having a first columnar structure 20a and a second columnar structure 30a, both of which include pillar-shaped objects (12a, 12a') as a plurality of regions having a relatively high refractive index (12, 12') in a region 11 having a relatively low refractive index, sequentially from the lower part along the film thickness direction.

Furthermore, the pillar-shaped objects 12a in the first columnar structure 20a have a bent section 14 at an intermediate point along the film thickness direction.

2. Optical Diffusion Characteristics

Figure 2:
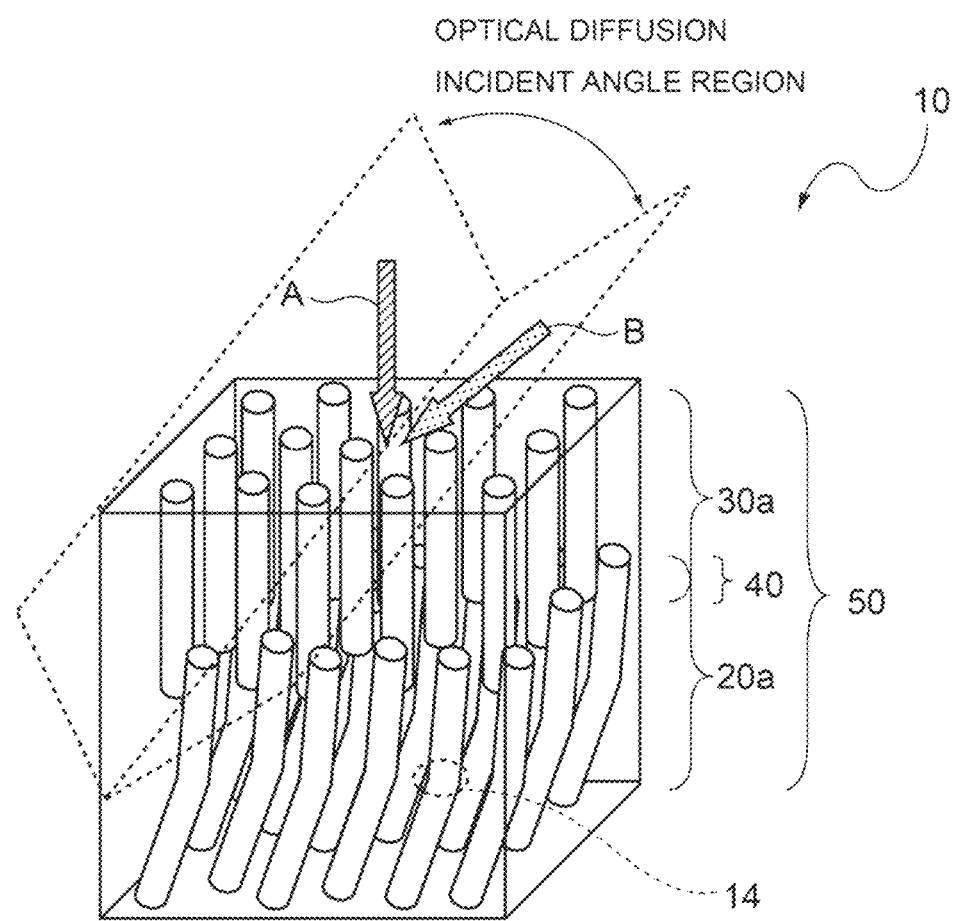
FIG. 2 is a diagram provided to explain the optical diffusion characteristics of the optical diffusion film of the invention.

Next, the optical diffusion characteristics of the optical diffusion film 10 of the invention will be specifically described using FIG. 2, by taking a case in which the first internal structure 20 and the second internal structure 30 are both columnar structures (20a, 30a) as an example.

Here, FIG. 2 shows a perspective view of the optical diffusion film 10.

As illustrated in such FIG. 2, the optical diffusion film 10 has a first columnar structure 20a and a second columnar structure 30a in the film, and is also provided with a bent section 14 in the pillar-shaped objects that constitute the first columnar structure 20a.

Therefore, as illustrated in FIG. 2, the overall optical diffusion incident angle region of the film can be effectively expanded by superposing three optical diffusion incident angle regions attributable to the first columnar structure 20a and the second columnar structure 30a while shifting the optical diffusion incident angle regions in an appropriate range.

Here, in a columnar structure, incident light coming at an incident angle that is approximately parallel to the angle of inclination of the pillar-shaped objects constituting the columnar structure, can be efficiently diffused without any loss. This is because such an incident angle is included in the optical diffusion incident angle region.

However, with regard to incident light coming at an incident angle that perfectly coincides with the angle of inclination of the pillar-shaped objects, the columnar structure may transmit the incident light without sufficiently diffusing it.

In this regard, the optical diffusion film 10 of the invention can effectively solve this problem.

For instance, as in the case of incident light represented by arrow A, incident light coming at an incident angle that is perfectly parallel to the angle of inclination of the pillar-shaped objects of the second columnar structure 30a tends to be not sufficiently diffused by the second columnar structure 30a. However, the optical diffusion film 10 illustrated in FIG. 2 gradually diffuses incident light in two stages by means of the first columnar structure 20a composed of pillar-shaped objects having a bent section 14, and can finally diffuse the incident light at a sufficient level.

Furthermore, for example, as in the case of incident light represented by arrow B, incident light coming at an incident angle that is significantly different from the angle of inclination of the pillar-shaped objects of the second columnar structure 30a, is merely diffused into a crescent shape by means of the lateral faces of the pillar-shaped objects of the second columnar structure 30a, and therefore, the incident light tends to be diffused insufficiently in the stage of the second columnar structure 30a. However, the optical diffusion film 10 illustrated in FIG. 2 can finally diffuse the incident light at a sufficient level by means of the first columnar structure 20a that is composed of the pillar-shaped objects having a bent section 14.

Therefore, the optical diffusion film of the invention can effectively suppress the changes in the optical diffusion characteristics associated with variation in the incident angle of incident light, while having the overall optical diffusion incident angle region of the film effectively expanded.

Figure 3:
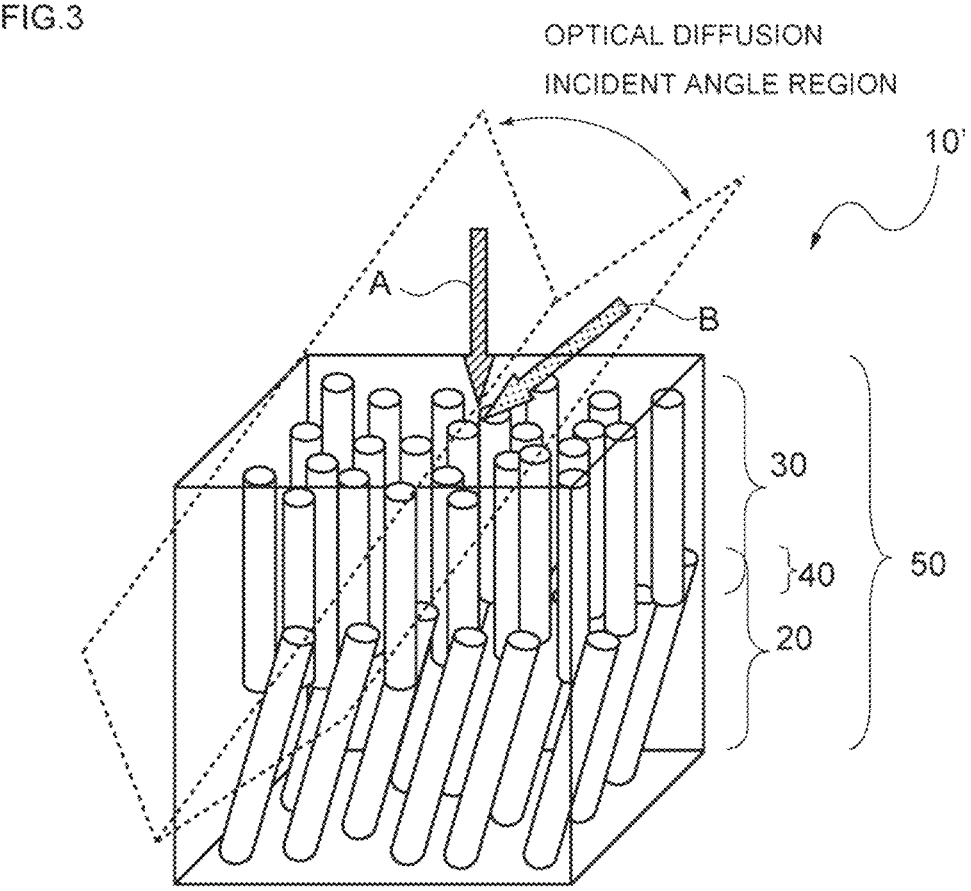
FIG. 3 is a diagram provided to explain the optical diffusion characteristics of a conventional optical diffusion film.

Meanwhile, even in a case in which incident light is diffused in two stages as illustrated in FIG. 3, the overall optical diffusion incident angle region of the film can be expanded.

However, there are occasions in which when it is attempted to expand the optical diffusion incident angle region to the same extent as that of the optical diffusion film 10 of the invention, the angles of inclination of the pillar-shaped objects of the first columnar structure 20 and the pillar-shaped objects of the second columnar structure 30 must be made significantly different. In this case, it may be difficult to effectively suppress the changes in the optical diffusion characteristics associated with variation in the incident angle of incident light.

For example, in an optical diffusion 10' illustrate in FIG. 3, incident light coming at an incident angle that is perfectly parallel to the angle of inclination of the pillar-shaped objects of the second columnar structure 30, such as incident light represented by the arrow A, may not be sufficiently diffused by the second columnar structure 30. Then, when such insufficiently diffused light penetrates into the first columnar structure at an incident angle that is significantly different from the angle of inclination of the pillar-shaped objects of the first columnar structure 20, the diffused light may not be efficiently guided into the pillar-shaped objects of the first columnar structure 20, and may not be finally diffused at a sufficient level.

Furthermore, for example, incident light coming at an incident angle that is significantly different from the angle of inclination of the pillar-shaped objects of the second columnar structure 30, such as incident light represented by the arrow B, is merely diffused in a crescent shape by the lateral faces of the pillar-shaped objects of the second columnar structure 30, and therefore, the incident light tends to be diffused insufficiently. In the case of the optical diffusion film 10' illustrated in FIG. 3, since the first columnar structure 20 is composed of pillar-shaped objects that do not have a bent section, the light that has been insufficiently diffused by the second columnar structure 30 may not be efficiently guided into the pillar-shaped objects of the first columnar structure 20, and the diffused light may not be finally diffused at a sufficient level.

Furthermore, when the angles of inclination of the first and second columnar structures are adjusted to be close to each other in order to improve such optical diffusion characteristics, the optical diffusion incident angle region becomes narrow.

Therefore, in the case of a conventional optical diffusion film of the type that diffuses light in two stages, the overall incident angle region of the film can be effectively expanded; however, it may be difficult to suppress any changes in the optical diffusion characteristics associated with variation in the incident angle of incident light.

The invention has been explained by taking a case in which incident light enters through the second columnar structure side as an example; however, the same also applies to a case in which incident light enters through the first columnar structure side.

Furthermore, diffusion in three stages has been explained as an example; however, the diffusion may also be diffusion in four or more stages.

In regard to the optical diffusion film of the invention, the invention has been explained by taking a case in which the first and second internal structures are both columnar structures as an example; however, there are no particular limitations on the first and second internal structures.

Figure 4A:
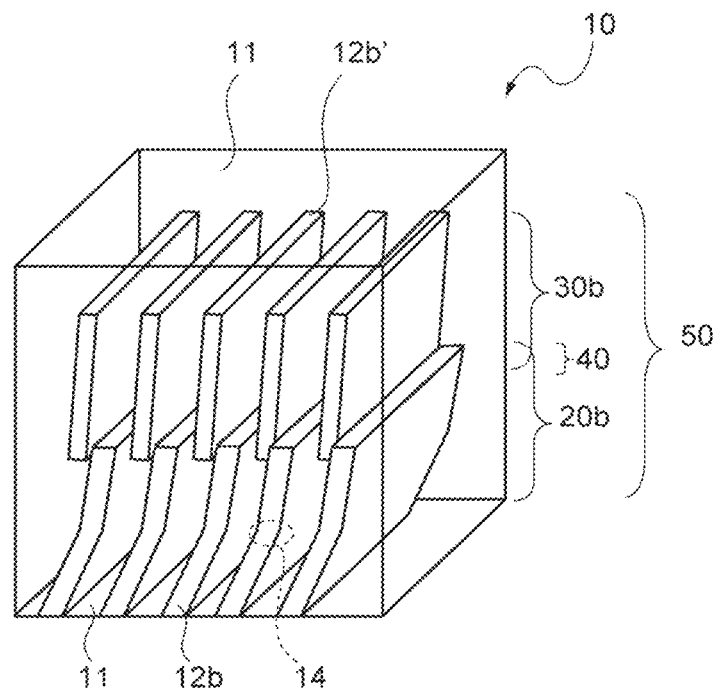
FIGS. 4(a) and 4(b) are diagrams provided to explain an embodiment of the optical diffusion film of the invention.
Figure 4B:
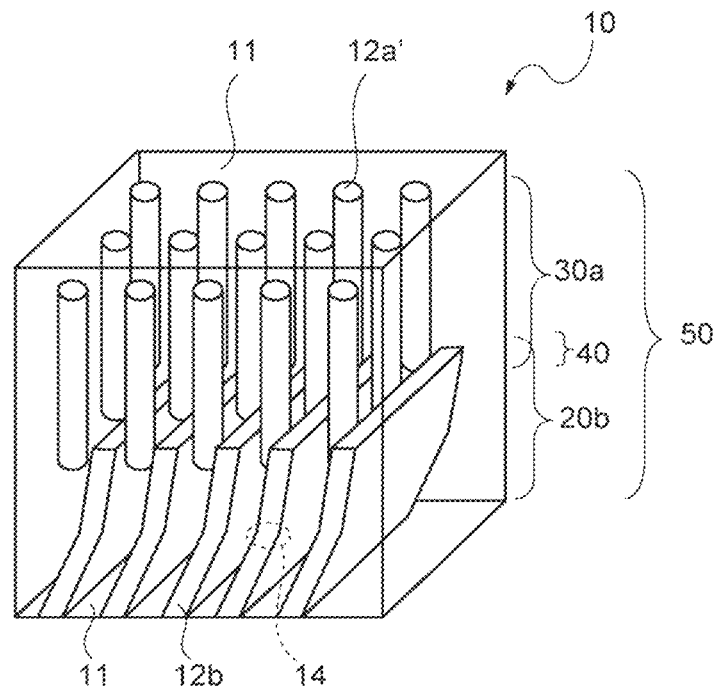

Specifically, an embodiment as illustrated in FIG. 4(a), in which the first and second internal structures are both louver structures (20b, 30b); an embodiment as illustrated in FIG. 4(b), in which the first internal structure is a louver structure 20b, while the second internal structure is a columnar structure 30a; and an embodiment in which the first internal structure is a columnar structure 20a, while the second internal structure is a louver structure 30b, may be mentioned.

There is a difference between a columnar structure and a louver structure that the columnar structure induces isotropic optical diffusion of incident light (optical diffusion by which the planar shape of diffused light becomes approximately circular), whereas the louver structure induces anisotropic optical diffusion of incident light (optical diffusion by which the planar shape of diffused light is linear).

Furthermore, it is speculated that optical diffusion by a columnar structure or a louver structure is achieved when light entering into a region having a relatively high refractive index, such as a pillar-shaped objects or a plate-shaped region in the respective structures, escapes the film while repeatedly undergoing reflection at the interface between the region having a relatively high refractive index and a region having a relatively low refractive index.

3. First Internal Structure

The first internal structure in the optical diffusion film of the invention is not particularly limited as long as it is a structure including a plurality of regions having a relatively high refractive index in a region having a relatively low refractive index; however, the first internal structure is characterized in that the regions having a relatively high refractive index has a bent section at an intermediate point along the film thickness direction.

In the following description, a bent columnar structure and a bent louver structure will be explained as examples.

(1) Bent Columnar Structure

As illustrated in FIG. 1(a), it is preferable that the first internal structure is a columnar structure 20a in which a plurality of pillar-shaped objects 12a having a relatively high refractive index are arranged to stand close together in the film thickness direction in a region 11 having a relatively low refractive index, the pillar-shaped objects 12a having a bent section 14 at an intermediate point along the film thickness direction.

The reason for this is that when such a bent columnar structure is employed, a distinct first internal structure having a predetermined difference in refractive index can be formed, and also, a bent section can be definitely provided in a region having a relatively high refractive index.

Hereinafter, the bent columnar structure will be specifically described.

(1)-1 Refractive Index

In regard to the bent columnar structure, it is preferable that the difference between the refractive index of the pillar-shaped objects having a relatively high refractive index and the refractive index of the region having a relatively low refractive index is adjusted to a value of 0.01 or more.

The reason for this is that if the difference in refractive index as such has a value of below 0.01, the range of angle at which incident light is fully reflected within the bent columnar structure becomes narrow, and thus, the incident angle dependency may be excessively decreased.

Therefore, it is more preferable that the difference in refractive index is adjusted to a value of 0.05 or more, and even more preferably to a value of 0.1 or more.

It is more preferable as the difference in refractive index is larger; however, from the viewpoint of selecting a material capable of forming a bent columnar structure, it is considered that the upper limit is about 0.3.

The term "incident angle dependency" means a characteristic that enables clear distinction between the incident angle region of incident light in which incident light is diffused, and the incident angle region of incident light in which incident light is not diffused.

(1)-2 Maximum Diameter and Interval

In regard to the bent columnar structure 20a illustrated in FIG. 1(a), it is preferable that the maximum diameter in a cross-section of a pillar-shaped object 12a and the interval between the pillar-shaped objects 12a are respectively adjusted to a value within the range of 0.1 to 15 μm.

The reason for this is that if the maximum diameter and the interval respectively have a value of below 0.1 μm, it may be difficult for the optical diffusion film to exhibit optical diffusion characteristics, regardless of the incident angle of incident light. On the other hand, it is because if the maximum diameter and the interval respectively have a value of above 15 μm, the amount of light propagating straight through the bent columnar structure increases, and uniformity of optical diffusion may be deteriorated.

Therefore, in regard to the bent columnar structure, it is more preferable that the maximum diameter and the interval are respectively set to a value of 0.5 μm or more, and even more preferably to a value of 1 μm or more.

Furthermore, in regard to the bent columnar structure, it is more preferable that the maximum diameter and the interval are respectively set to a value of 10 μm or less, and even more preferably to a value of 5 μm or less.

The cross-sectional shape of the pillar-shaped object is not particularly limited; however, it is preferable to make the cross-sectional shape into, for example, a circular shape, an elliptical shape, a polygonal shape, or an irregular shape.

The cross-section of a pillar-shaped object means a cross-section obtained by cutting the pillar-shaped object along a plane parallel to the film surface.

Furthermore, the maximum diameter, length and the like of a pillar-shaped object can be calculated by making an observation with an optical digital microscope.

(1)-3 Thickness

It is preferable that the thickness (length in the film thickness direction) of the bent columnar structure 20a illustrated in FIG. 1(a), that is, the length L1 in FIG. 1(b), is adjusted to a value within the range of 30 to 500 μm.

The reason for this is that if the length L1 has a value of below 30 μm, the amount of light propagating straight through the bent columnar structure increases, and it may be difficult to obtain sufficient incident angle dependency and a sufficient optical diffusion incident angle region. On the other hand, it is because if the length L1 has a value of above 500 μm, when a bent columnar structure is formed by irradiating a composition for an optical diffusion film with active energy radiation, the direction of progress of photopolymerization is diffused by the columnar structure that has been initially formed, and it may be difficult to form a desired bent columnar structure.

Therefore, it is more preferable that the length L1 of the bent columnar structure is adjusted to a value of 50 μm or more, and even more preferably to a value of 70 μm or more.

It is also more preferable that the length L1 of the bent columnar structure is adjusted to a value of 325 μm or less, and even more preferably to a value of 200 μm or less.

Furthermore, in the bent columnar structure 20a illustrated in FIG. 1(a), it is preferable that the length in the film thickness direction of the pillar-shaped objects 12a in the portion upper than the bent section 14 (portion on the side that is irradiated with active energy radiation when the optical diffusion film is manufactured, with respect to the bent section as a reference), that is, the length La in FIG. 1(b), is adjusted to a value within the range of 15 to 475 μm.

The reason for this is that if the length La has a value of below 15 μm, diffusion induced by the columnar structure in the upper portion becomes too weak, and it may be difficult to effectively expand the optical diffusion incident angle region. Meanwhile, as the content of an ultraviolet absorber in the composition for an optical diffusion film is larger, the length tends to become shorter. Therefore, in other words, when it is said that the length is excessively short, the content of the ultraviolet absorber becomes very large, and in that case, when a composition for an optical diffusion film is photocured, the possibility of generation of shrinkage wrinkles in the film is increased, and control is difficult.

On the other hand, if the length La has a value of above 475 μm, the content of the ultraviolet absorber becomes very small, and in that case, the columnar structure in the lower portion is not sufficiently formed, and there is a possibility that it may be difficult to effectively expand the optical diffusion incident angle region.

Therefore, it is more preferable that the length La of the pillar-shaped objects in the portion upper than the bent section in the bent columnar structure is adjusted to a value of 25 μm or more, and even more preferably to a value of 30 μm or more.

Furthermore, it is more preferable that the length La of the pillar-shaped objects in the portion upper than the bent section in the bent columnar structure is adjusted to a value of 300 μm or less, and even more preferably to a value of 150 μm or less.

It is also preferable that the length in the film thickness direction of the pillar-shaped objects 12a in the portion lower than the bent section 14 (portion on the opposite side of the above-mentioned upper portion with respect to the bent section as a reference) in the bent columnar structure 20a illustrated in FIG. 1(a), that is, the length Lb in FIG. 1(b), is adjusted to a value within the range of 15 to 475 μm.

The reason for this is that if the length Lb has a value of below 15 μm, diffusion originating from the columnar structure in the lower portion becomes so weak that it may be difficult to effectively expand the optical diffusion incident angle region. On the other hand, it is because if the length Lb has a value of above 475 μm, although diffusion originating from the columnar structure of the lower portion can be sufficiently obtained, the film thickness of the optical diffusion film becomes excessively thick, and application of the optical diffusion film for display use may be infeasible.

Accordingly, it is more preferable that the length Lb of the pillar-shaped objects in the portion lower than the bent section in the bent columnar structure is adjusted to a value of 25 μm or more, and even more preferably to a value of 30 μm or more.

Furthermore, it is more preferable that the length Lb of the pillar-shaped objects in the portion lower than the bent section in the bent columnar structure is adjusted to a value of 300 μm or less, and even more preferably to a value of 150 μm or less.

(1)-4 Angle of Inclination

In regard to the bent columnar structure 20a illustrated in FIG. 1(a), it is preferable that the pillar-shaped objects 12a as the regions 12 having a relatively high refractive index (hereinafter, may be referred to as highly refractive regions) are arranged in parallel at a constant angle of inclination in the film thickness direction.

The reason for this is that when the angle of inclination of the pillar-shaped objects is made constant, incident light is more stably reflected within the bent columnar structure, and therefore, the incident angle dependency originating from the bent columnar structure can be further enhanced.

More specifically, as illustrated in FIG. 1(b), it is preferable that the angle of inclination θa, with respect to the normal line of the film plane, of the pillar-shaped objects 12a as a highly refractive region 12 in the portion upper than the bent section 14 in the bent columnar structure 20a as the first internal structure 20, is adjusted to a value within the range of 0° to 30°.

The reason for this is that when the angle of inclination θa has a value of above 30°, the absolute value of the incident angle of active energy radiation also becomes large accordingly, thereby the proportion of reflection of the active energy radiation at the interface between air and the coating layer increases, and on the occasion of forming the bent columnar structure, it becomes necessary to irradiate the optical diffusion film with active energy radiation with higher illuminance. On the other hand, in a case in which the active energy radiation indeed enters at 0°, there is a possibility that a factor causing bending may not be obtained, and consequently, there is a possibility that bending may not occur.

Therefore, it is more preferable that the angle of inclination θa is adjusted to a value of 0.5° or more, and even more preferably to a value of 1° or more.

It is also more preferable that the angle of inclination θa is adjusted to a value of 25° or less, and even more preferably to a value of 20° or less.

Furthermore, as illustrated in FIG. 1(b), it is preferable that the angle of inclination θb, with respect to the normal line of the film plane, of the pillar-shaped objects 12a in the lower portion of the bent section 14 in the bent columnar structure 20a as the first internal structure 20 is adjusted to a value within the range of 1° to 60°.

The reason for this is that when the angle of inclination θb has a value of below 1°, even if a synergistic effect with the pillar-shaped objects in the portion upper than the bent section is considered, it may be difficult to sufficiently obtain an effect of expanding the optical diffusion incident angle region. On the other hand, when the angle of inclination θb has a value of above 60°, since the absolute value of the incident angle of active energy radiation also becomes larger, the proportion of reflection of active energy radiation at the interface between air and the coating layer increases, and on the occasion of forming a bent columnar structure, there is a need to irradiate the optical diffusion film with active energy radiation with higher illuminance. Furthermore, when a synergistic effect with the pillar-shaped objects in the portion upper than the bent section is considered, the optical diffusion incident angle region can be sufficiently expanded even without further increasing the angle of inclination.

Therefore, it is more preferable that the angle of inclination θb is adjusted to a value of 3° or more, and even more preferably to a value of 5° or more.

It is also more preferable that the angle of inclination θb is adjusted to a value of 55° or less, and even more preferably to a value of 50° or less.

Furthermore, it is preferable that the absolute value of $\theta b-\theta a$ is adjusted to a value of 1° or more, more preferably to a value of 3° or more, and even more preferably to a value of 5° or more.

It is also preferable that the absolute value of $\theta b-\theta a$ is adjusted to a value of 30° or less, more preferably to a value of 25° or less, and even more preferably to a value of 20° or less.

Meanwhile, $\theta a$ and $\theta b$ mean the angles of inclination (°) of pillar-shaped objects obtainable in a case in which the angle of the normal line with respect to the film surface, which is measured at a cross-section when the film is cut along a plane that is perpendicular to the film plane and cuts the entirety of one pillar-shaped object into two along the axial line, is designated as 0°.

More specifically, as illustrated in FIG. 1(b), $\theta a$ means the angle of a narrower side between the angles formed by the normal line of the film plane and the axial line at the top of the pillar-shaped objects in the portion upper than the bent section.

Furthermore, $\theta b$ means the angle on the narrower side between the angles formed by the normal line of the film plane and the axial line at the top of the pillar-shaped objects in the portion lower than the bent section.

(2) Bent Louver Structure

As illustrated in FIGS. 4(a) and 4(b), it is preferable that the first internal structure is a bent louver structure 20b in which a plurality of plate-shaped regions (11, 12b) having different refractive indices are alternately disposed in any one direction along the film plane, and that the first internal structure is a bent louver structure 20b in which the plate-shaped regions (11, 12b) have a bent section 14 at an intermediate point along the film thickness direction.

The reason for this is that when such a bent louver structure is used, a distinct first internal structure having a predetermined difference in refractive index can be formed, and also, a distinct bent section can be provided in the regions having a relatively high refractive index.

(2)-1 Refractive Index

It is preferable that the relation between the refractive index of the plate-shaped regions having a relatively high refractive index and the refractive index of the plate-shaped regions having a relatively low refractive index in the bent louver structure is regulated to be the same as the relation between the refractive index of the pillar-shaped objects having a relatively high refractive index and the refractive index of the pillar-shaped objects having a relatively low refractive index in the bent columnar structure as described above.

(2)-2 Width

Furthermore, it is preferable that the width of the high refractive index plate-shaped regions 12b and the low refractive index plate-shaped regions 11 having different refractive indices in the bent louver structure 20b illustrated in FIGS. 4(a) and 4(b), is adjusted to be the same as the maximum diameter in a cross-section of the pillar-shaped objects and the interval between the pillar-shaped objects in the bent columnar structure as described above.

(2)-3 Thickness

It is preferable that the thickness of the bent louver structure 20b (length in the film thickness direction) illustrated in FIGS. 4(a) and 4(b) is adjusted to be the same as the thickness of the bent columnar structure as described above.

(2)-4 Angle of Inclination

It is also preferable that the angle of inclination of the plate-shaped regions (11, 12b) having different refractive indices in the bent louver structure 20b illustrated in FIGS. 4(a) and 4(b) is adjusted to be the same as the angle of inclination of the pillar-shaped objects in the bent columnar structure as described above.

The angle of inclination of the plate-shaped regions means the angle of inclination (°) of plate-shaped regions in a case in which the angle of the normal line with respect to the film surface, which is measured at a cross-section when the film is cut at a plane perpendicular to the plate-shaped region extending in any one direction along the film plane, is designated as 0°.

4. Second Internal Structure

The second internal structure in the optical diffusion film of the invention has basically the same configuration as that of the first internal structure as described above, and therefore, repeated description of specific matters will not be given here.

However, it is preferable that unlike the first internal structure as described above, as illustrated in FIG. 1(a) and FIGS. 4(a) and 4(b), the regions having a relatively high refractive index do not have a bent section at an intermediate point along the film thickness direction.

The reason for this is speculated that the second internal structure is formed by irradiating the optical diffusion film with active energy radiation at low illuminance, and since the upper limit of the thickness is limited, it is difficult to form a bent internal structure having a sufficient length in the vertical direction.

Furthermore, the composition of the region where an internal structure is not formed, in which the second internal structure is to be formed, is different from the composition of the initial composition for an optical diffusion film because the first internal structure has already been formed, and therefore, the composition tends to be separated in the vertical direction in the second internal structure.

Accordingly, it is speculated that in the second internal structure, there is a tendency that bending is not easily formed due to such separation of composition.

Furthermore, it is also speculated to be because the ultraviolet absorber is consumed up for the first internal structure because the first internal structure is formed first, and there is no ultraviolet absorber remaining in the region where an internal structure is not formed, which is needed for bending the second internal structure.

It is preferable that the thickness (length in the film thickness direction) of the second internal structure (30a, 30b) as illustrated in FIG. 1(a) and FIGS. 4(a) and 4(b), that is, L2 in FIG. 1(b), is adjusted to a value within the range of 10 to 200 µm.

The reason for this is that the second internal structure is a part that accomplishes an ancillary role in optical diffusion with respect to the first internal structure.

Therefore, it is more preferable that the length L2 of the second internal structure is adjusted to a value of 20 µm or more, and even more preferably to a value of 40 µm or more.

It is also more preferable that the length L2 of the second internal structure is adjusted to a value of 150 µm or less, and even more preferably to a value of 100 µm or less.

For the same reason as the case of the angle of inclination $\theta a$, it is preferable that the angle of inclination $\theta c$ of the regions 12' having a relatively high refractive index in the second internal structure 30 as illustrated in FIG. 1(b) is adjusted to a value within the range of 0° to 30°.

Therefore, it is more preferable that the angle of inclination $\theta c$ is adjusted to a value of 25° or less, and even more preferably to a value of 20° or less.

Furthermore, it is preferable that the angles of inclination θa, θb and θc are inclined to the same side (also including the angle of inclination of 0°), while the angles of inclination become gradually larger in this sequence.

The reason for this is that as the angles of inclination gradually change, the optical diffusion incident angle regions originating from the respective internal structures also overlap, and the changes in the optical diffusion characteristics associated with variation in the incident angle of incident light can be more effectively suppressed.

5. Overlapping Internal Structure

As illustrated in FIG. 1(b), it is preferable that the optical diffusion film 10 of the invention has an overlapping internal structure 40 in which the position of the upper end of the first internal structure 20 and the position of the lower end of the second internal structure 30 overlap with each other in the film thickness direction.

The reason for this is that when the optical diffusion film has an overlapping internal structure, the generation of scattered light can be effectively suppressed, and the uniformity of the intensity of diffused light can be enhanced, compared to a case in which the portion in which an internal structure is not formed exists between the respective internal structures.

In the following description, the overlapping internal structure will be specifically explained.

(1) Embodiment

The overlapping internal structure is not particularly limited as long as the position of the upper end of the first internal structure and the position of the lower end of the second internal structure are formed so as to overlap with each other in the film thickness direction.

Figure 5A:
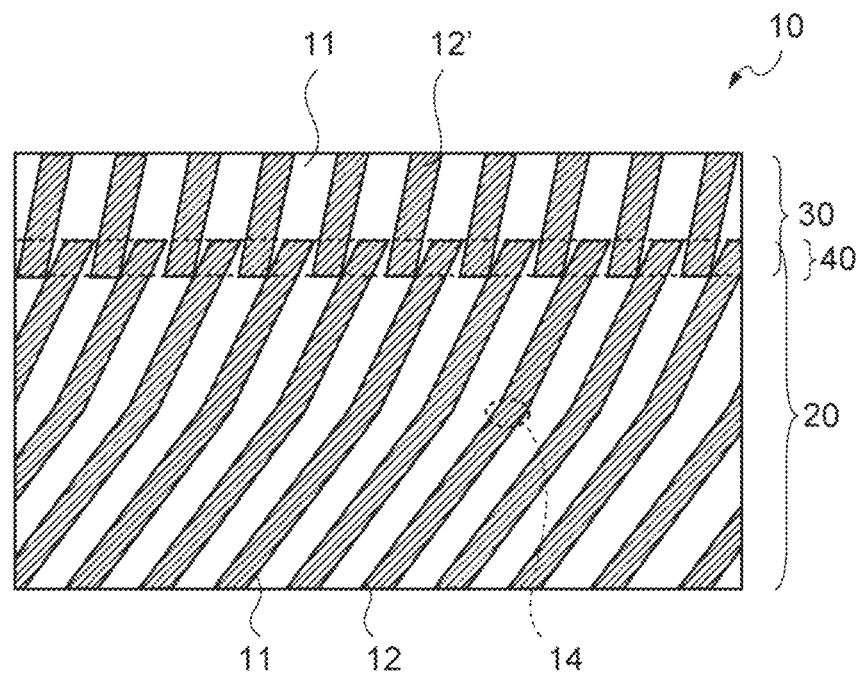
FIGS. 5(a) and 5(b) are diagrams provided to explain an embodiment of the overlapping internal structure.

More specifically, it is preferable that, as illustrated in FIG. 5(a), the overlapping internal structure is an overlapping columnar structure 40 in which the tips of the regions having a relatively high refractive index (12, 12'), which originate from any one of the first internal structure 20 and the second internal structure 30, are in contact with the vicinity of the tips of the regions having a relatively high refractive index (12', 12), which originate from the other internal structure (30, 20).

Figure 5B:
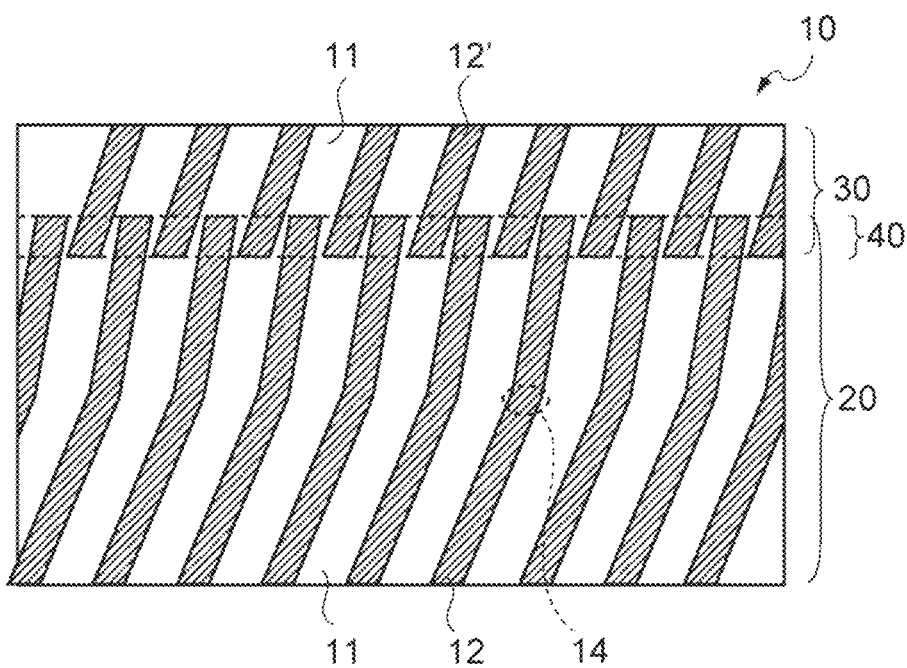

Alternatively, it is also preferable that, as illustrated in FIG. 5(b), the overlapping internal structure is an overlapping internal structure 40 in which the regions having a relatively high refractive index (12, 12'), which originate from any one of the first internal structure 20 and the second internal structure 30, overlap with such regions of the same kind in a non-contact state.

(2) Difference in Angle of Inclination

It is preferable that the absolute value of the difference between the angles of inclination (θa, θc) of the regions having relatively high refractive indices (12, 12'), which respectively originate from the first internal structure 20 and the second internal structure 30, is adjusted to a value of 1° or more.

The reason for this is that when the absolute value of the difference between the angles of inclination is adjusted to a value of 1° or more, the optical diffusion incident angle regions can be more effectively expanded. On the other hand, if the absolute value of the difference between the angles of inclination has an excessively large value, the optical diffusion incident angle regions attributable to the various internal structures of the optical diffusion film become perfectly independent of each other, and the overall optical diffusion incident angle regions of the film may not be efficiently expanded.

Therefore, it is more preferable that the absolute value of the difference between the angles of inclination is adjusted to a value of 2° or more, and even more preferably to a value of 5° or more.

Furthermore, it is also preferable that the absolute value of the difference between the angles of inclination is adjusted to a value of 30° or less, and even more preferably to a value of 20° or less.

(3) Thickness

It is preferable that the thickness (length in the film thickness direction) L3 of the overlapping internal structure illustrated in FIG. 1(b) is adjusted to a value within the range of 1 to 40 µm.

The reason for this is that if the length L3 has a value of below 1 µm, scattered light is likely to be generated at the connection part of the respective internal structures, and it may be difficult to retain the uniformity of the intensity of diffused light more stably. On the other hand, it is because if the length L3 has a value of above 40 µm, the efficiency for extracting diffused light may be decreased. That is, in a case in which the length of the overlapping internal structure is too long, it is expected that backscattering or the like may occur in the relevant region, and a decrease in the efficiency for extracting diffused light may be brought about.

Therefore, it is more preferable that the length L3 of the overlapping internal structure is adjusted to a value of 3 µm or more, and even more preferably to a value of 5 µm or more.

It is also more preferable that the length L3 of the overlapping internal structure is adjusted to a value of 35 µm or less, and even more preferably to a value of 30 µm or less.

6. Total Film Thickness

Furthermore, it is preferable that the total film thickness of the optical diffusion film of the invention is adjusted to a value within the range of 60 to 700 µm.

The reason for this is that if the total film thickness of the optical diffusion film has a value of below 60 µm, the amount of incident light that propagates straight through the internal structure increases, and it may be difficult for the optical diffusion film to exhibit optical diffusion. On the other hand, it is because if the total film thickness of the optical diffusion film has a value of above 700 µm, when an internal structure is formed by irradiating a composition for an optical diffusion film with active energy radiation, the direction of progress of photopolymerization is diffused by the internal structure that has been initially formed, and it may be difficult to form a desired internal structure.

Therefore, it is more preferable that the total film thickness of the optical diffusion film is adjusted to a value of 80 µm or more, and even more preferably to a value of 100 µm or more.

Furthermore, it is more preferable that the total film thickness of the optical diffusion film is adjusted to a value of 450 µm or less, and even more preferably to a value of 250 µm or less.

7. Pressure-Sensitive Adhesive Layer

The optical diffusion film of the invention may also include a pressure-sensitive adhesive layer for lamination of the optical diffusion film with other materials on one surface or on both surfaces of the optical diffusion film.

The pressure-sensitive adhesive that constitutes such a pressure-sensitive adhesive layer is not particularly limited, and any conventionally known acrylic, silicone-based, urethane-based, or rubber-based pressure-sensitive adhesive can be used.

Second Embodiment

A second embodiment of the invention relates to a method for manufacturing the optical diffusion film of the first embodiment, the method being a method for manufacturing an optical diffusion film including the following steps (a) to (d):

(a) a step of preparing a composition for an optical diffusion film including at least two polymerizable compounds having different refractive indices, a photopolymerization initiator and an ultraviolet absorber, in which the content of the ultraviolet absorber has a value of below 2 parts by weight (provided that 0 parts by weight is excluded) relative to the total amount (100 parts by weight) of the at least two polymerizable compounds having different refractive indices;

(b) a step of applying the composition for an optical diffusion film on a process sheet, and forming a coating layer;

(c) a step of irradiating the coating layer with first active energy radiation, forming a first internal structure in the lower portion of the coating layer, and also leaving a region where an internal structure is not formed, in the upper portion of the coating layer; and (d) a step of irradiating the coating layer with second active energy radiation, and forming a second internal structure in the region where an internal structure is not formed.

In the following description, the second embodiment of the invention will be specifically explained with reference to the drawings, mainly based on the differences between the second embodiment and the first embodiment.

1. Step (a): Step of Preparing Composition for Optical Diffusion Film

Step (a) is a step of preparing a predetermined composition for an optical diffusion film.

More specifically, it is preferable that two polymerizable compounds having different refractive indices and the like are stirred under high temperature conditions of 40° C. to 80° C., and thereby a uniform mixed liquid is obtained.

Furthermore, it is preferable that a solution of the composition for an optical diffusion film is obtained by further adding a diluent solvent as necessary, in order to obtain a desired viscosity.

Step (a) will be more specifically explained in the following description.

(1)(A) High Refractive Index Polymerizable Compound (1)-1 Refractive Index

It is preferable that the refractive index of the polymerizable compound having a higher refractive index (hereinafter, may be referred to as component (A)) between the two polymerizable compounds having different refractive indices is adjusted to a value within the range of 1.5 to 1.65.

The reason for this is that if the refractive index of the component (A) has a value of below 1.5, the difference between this value and the refractive index of the polymerizable compound having a lower refractive index (hereinafter, may be referred to as component (B)) becomes too small, and it may be difficult to obtain an effective optical diffusion angle region. On the other hand, it is because if the refractive index of the component (A) has a value of above 1.65, the difference between this value and the refractive index of the component (B) becomes larger; however, it may be difficult to form even an apparently compatible state with the component (B).

Therefore, it is more preferable that the refractive index of the component (A) is adjusted to a value of 1.55 or more, and even more preferably to a value of 1.56 or more.

It is also more preferable that the refractive index of the component (A) is adjusted to a value of 1.6 or less, and even more preferably to a value of 1.59 or less.

The refractive index of the component (A) as described above means the refractive index of the component (A) before the component is cured by light irradiation.

Furthermore, the refractive index can be measured according to, for example, JIS K0062.

Meanwhile, the term "optical diffusion angle region" means the range of the diffusion angle of diffused light obtainable in a state in which a point light source is fixed at an angle at which incident light is most diffused in an optical diffusion film.

The width" of the "optical diffusion angle region" is known to be almost equal to the width of the "optical diffusion incident angle region".

(1)-2 Type

The type of component (A) is not particularly limited; however, examples thereof include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate, and compounds obtainable by partially substituting the aforementioned compounds with a halogen, an alkyl, an alkoxy, an alkyl halide or the like.

The term "(meth)acrylic acid" means both acrylic acid and methacrylic acid.

Also, it is more preferable that a compound containing a biphenyl ring is included as the component (A), and particularly, it is even more preferable that a biphenyl compound represented by the following Formula (1) is included.

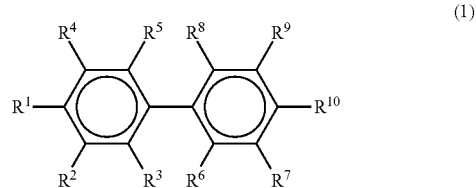

(1)

wherein in Formula (1), $R^1$ to $R^{10}$ are respectively independent of each other, and at least one of $R^1$ to $R^{10}$ represents a substituent represented by the following Formula (2), while the others each represent any one substituent selected from a hydrogen atom, a hydroxyl group, a carboxyl group, an alkyl group, an alkoxy group, an alkyl halide group, a hydroxyalkyl group, a carboxyalkyl group, and a halogen atom.

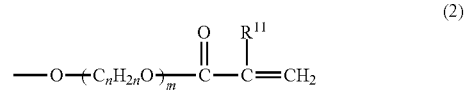

(2)

wherein in Formula (2), $R^{11}$ represents a hydrogen atom or a methyl group; the number of carbon atoms n represents an integer from 1 to 4; and the number of repetitions m represents an integer from 1 to 10.

The reason for this is speculated that when a biphenyl compound having a particular structure is included as the component (A), a predetermined difference is made between the rates of polymerization of the component (A) and the component (B), compatibility between the component (A) and the component (B) is lowered to a predetermined range, and copolymerizability between the two components can be deteriorated.

Furthermore, the difference between the refractive index of the high refractive index region originating from the component (A) and the refractive index of the low refractive index region originating from the component (B) can be more easily regulated to a value larger than or equal to a predetermined value, by increasing the refractive index of the high refractive index region originating from the component (A).

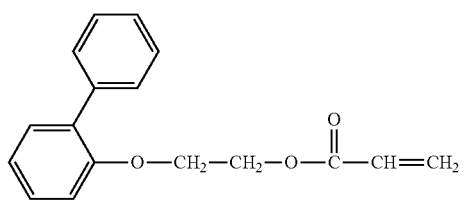

(3)

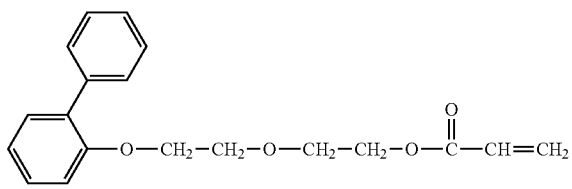

(4)

(1)-3 Content

Furthermore, it is preferable that the content of the component (A) in the composition for an optical diffusion film is adjusted to a value within the range of 25 to 400 parts by weight relative to 100 parts by weight of the component (B) that will be described below.

The reason for this is that if the content of the component (A) has a value of below 25 parts by weight, the existence ratio of the component (A) with respect to the component (B) becomes small, the width of the high refractive index region originating from the component (A) becomes excessively small compared to the width of the low refractive index region originating from the component (B), and it may be difficult to obtain a predetermined internal structure having satisfactory incident angle dependency. On the other hand, it is because if the content of the component (A) has a value of above 400 parts by weight, the existence ratio of the component (A) with respect to the component (B) becomes large, the width of the high refractive index region originating from the component (A) becomes excessively large compared to the width of the low refractive index region originating from the component (B), and in contrast, it may be difficult to obtain a predetermined internal structure having satisfactory incident angle dependency.

Therefore, it is more preferable that the content of the component (A) is adjusted to a value of 40 parts by weight or more, and even more preferably to a value of 50 parts by weight or more, relative to 100 parts by weight of the component (B).

Furthermore, it is more preferable that the content of the component (A) Is adjusted to a value of 300 parts by weight or less, and even more preferably to a value of 200 parts by weight or less, relative to 100 parts by weight of the component (B).

(2) Low Refractive Index Polymerizable Compound
(2)-1 Refractive Index

It is preferable that the refractive index of component (B), that is, the polymerizable compound having a lower refractive index between the two polymerizable compounds having different refractive indices, is adjusted to a value within the range of 1.4 to 1.5.

The reason for this is that if the refractive index of the component (B) has a value of below 1.4, the difference between the refractive index of the component (B) and the refractive index of the component (A) becomes large; however, compatibility with the component (A) is extremely deteriorated, and it may be difficult to form a predetermined internal structure. On the other hand, it is because if the refractive index of the component (B) has a value of above 1.5, the difference between the refractive index of the component (B) and the refractive index of the component (A) becomes too small, and it may be difficult to obtain desired incident angle dependency.

Therefore, it is more preferable that the refractive index of the component (B) is adjusted to a value of 1.45 or more, and even more preferably to a value of 1.46 or more.

It is also more preferable that the refractive index of the component (B) is adjusted to a value of 1.49 or less, and even more preferably to a value of 1.48 or less.

The refractive index of the component (B) described above means the refractive index of the component (B) before being cured by light irradiation.

Furthermore, the refractive index can be measured according to, for example, JIS K0062.

Furthermore, it is preferable that the difference between the refractive index of the component (A) and the refractive index of the component (B) as described above is adjusted to a value of 0.01 or more.

The reason for this is that if such difference in the refractive index has a value of below 0.01, the range of the angle at which incident light is fully reflected within a predetermined internal structure is narrowed, and therefore, the optical diffusion angle region may become excessively narrow. On the other hand, it is because the difference in the refractive index as an excessively large value, compatibility between the component (A) and the component (B) is excessively deteriorated, and it may be difficult to form a predetermined internal structure.

Therefore, it is more preferable that the difference between the refractive index of the component (A) and the refractive index of the component (B) is adjusted to a value of 0.05 or more, and even more preferably to a value of 0.1 or more.

It is also more preferable that the difference between the refractive index of the component (A) and the refractive index of the component (B) is adjusted to a value of 0.5 or less, and even more preferably to a value of 0.2 or less.

The refractive indices of the component (A) and the component (B) as used herein mean the refractive indices of the component (A) and the component (B) before being cured by light irradiation.

(2)-2 Type

Furthermore, the type of the component (B) is not particularly limited; however, examples thereof include urethane (meth)acrylate, a (meth)acrylic polymer having a (meth)acryloyl group in a side chain, a (meth)acryloyl group-containing silicone resin, and an unsaturated polyester resin. However, it is particularly preferable to use urethane (meth)acrylate.

The reason for this is that when urethane (meth)acrylate is used, the difference between the refractive index of the high refractive index region originating from the component (A) and the refractive index of the low refractive index region originating from the component (B) can be more easily regulated, the variation in the refractive index of the low refractive index region originating from the component (B) is effectively suppressed, and the optical diffusion film including a predetermined internal structure can be more efficiently obtained.

Meanwhile, (meth)acrylate means both acrylate and methacrylate.

(3) Photopolymerization Initiator

Furthermore, in regard to the composition for an optical diffusion film according to the second embodiment of the invention, it is preferable that a photopolymerization initiator is incorporated as component (C), if desired.

The reason for this is that by incorporating a photopolymerization initiator, a predetermined internal structure can be efficiently formed when the composition for an optical diffusion film is irradiated with active energy radiation.

Here, the photopolymerization initiator refers to a compound which generates a radical species through irradiation with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroycyclohexyl phenyl ketone, 2-methyl-1-[4-(methylthio)phenyl]-2-morpholinopropan-1-one, 4-(2-hydroxyethoxy)phenyl-2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiarybutylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, acetophenone dimethyl ketal, p-dimethylamine benzoic acid ester, and oligo[2-hydroxy-2-methyl-1-[4-(1-methylvinyl)phenyl]propane]. These may be used singly, or two or more kinds thereof may be used in combination.

In a case in which a photopolymerization initiator is used, the content thereof is preferably adjusted to a value within the range of 0.2 to 20 parts by weight, more preferably to a value within the range of 0.5 to 15 parts by weight, and even more preferably to a value within the range of 1 to 10 parts by weight relative to the total amount of 100 parts by weight of the component (A) and the component (B).

(4) Ultraviolet Absorber (4)-1 Type

It is preferable that the composition for an optical diffusion film according to the second embodiment of the invention includes an ultraviolet absorber as component (D).

The reason for this is that by incorporating an ultraviolet absorber as component (D), when the composition is irradiated with active energy radiation, the composition for an optical diffusion film can selectively absorb active energy radiation having a predetermined wavelength in a predetermined range.

As a result, bending can be induced in the first internal structure formed within the film, without inhibiting curing of the composition for an optical diffusion film.

Here, at this moment, a specific mechanism by which an ultraviolet absorber causes bending in the first internal structure that is formed in the film has not been sufficiently elucidated.

However, the mechanism is speculated as follows.

A tendency has been confirmed, in which as the amount of addition of the ultraviolet absorber is smaller, the angle of bending becomes smaller, and the optical diffusion angle region is narrowed.

Furthermore, it has been confirmed that as the ultraviolet absorber has a peak at a wavelength closer to the wavelength of 365 nm, which is the main wavelength of a high pressure mercury lamp, bending is induced with a smaller amount of addition of the ultraviolet absorber.

Therefore, it is speculated that as the wavelength of ultraviolet emitted from a high pressure mercury lamp is controlled by the ultraviolet absorber, that is, as the intensity ratios of various wavelengths in the ultraviolet radiation emitted from the high pressure mercury lamp varies, the progress of polymerization toward the lower part in the film thickness direction in the coating layer is delayed, and the direction of progress of polymerization is changed at a depth at which polymerization has progressed to a certain extent.

Regarding a factor that causes a change in the direction of progress of polymerization, the difference between the refractive indices of the component (A) and the component (B) may be considered; however, based on calculations, such difference in the refractive index does not cause bending to an extent that can be actually recognized.

Furthermore, it is preferable that the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

The reason for this is that when these ultraviolet absorbers are used, bending can be induced more reliably in the first internal structure, and therefore, the optical diffusion incident angle region in the resulting optical diffusion film can be more effectively expanded.

That is, it is because it has been confirmed that when these ultraviolet absorbers having peaks at wavelengths that are closer to the wavelength of 365 nm, which is the main wavelength of a high pressure mercury lamp, are used, bending is induced with small amounts of addition of the ultraviolet absorbers.

(4)-2 Absorption Wavelength

It is also preferable that the component (D) has an absorption peak for light having a wavelength of 330 to 380 nm.

The reason for this is that when the absorption peak of the component (D) is within the range described above, the composition for an optical diffusion film can efficiently absorb energy at 365 nm, which is the main wavelength of a high pressure mercury lamp, and a first internal structure having a bending can be efficiently formed in the resulting optical diffusion film.

Meanwhile, regarding ultraviolet absorbers having absorption peaks at wavelengths of below 330 nm, many of them exhibit very low absorption of light having a wavelength of 365 nm. Therefore, even if such an ultraviolet absorber is used, a first internal structure having sufficient bending may not be formed in the resulting optical diffusion film.

On the other hand, regarding ultraviolet absorbers having absorption peaks at wavelengths of above 380 nm, many of them definitely exhibit absorption of light having a wavelength of 365 nm. However, such ultraviolet absorbers often have absorption over the entire ultraviolet region, and in order to gain absorption at 365 nm, it is necessary to increase the amount of addition of the ultraviolet absorber. As a result, in a case in which an ultraviolet absorber having an absorption peak at a wavelength of above 380 nm is used, curing of the optical diffusion film may be inhibited per se.

Therefore, it is more preferable that the component (d) is regulated to have an absorption peak at a wavelength in the range of 335 to 375 nm, and even more preferably at a wavelength in the range of 340 to 370 nm.

(4)-3 Content

It is preferable that the content of the component (D) in the composition for an optical diffusion film is adjusted to value of below 2 parts by weight (provided that 0 parts by weight is excluded) relative to the total amount (100 parts by weight) of the component (A) and the component (B).

The reason for this is that when the content of the component (D) is adjusted to a value within such a range, bending can be induced in the first internal structure formed within the film, without inhibiting curing of the composition for an optical diffusion film, and thereby, the optical diffusion incident angle region can be effectively expanded in the resulting optical diffusion film.

That is, it is because if the content of the component (D) has a value of 2 parts by weight or more, curing of the composition for an optical diffusion film is inhibited, shrinkage wrinkles may occur at the film surface, or curing may not proceed at all. On the other hand, it is because if the content of the component (D) becomes excessively small, it may be difficult to induce sufficient bending in the first internal structure that is formed within the film, and it may be difficult to effectively expand the optical diffusion incident angle region in the resulting optical diffusion film.

Therefore, it is more preferable that the content of the component (D) is adjusted to a value of 0.01 parts by weight or more, and even more preferably to a value of 0.02 parts by weight or more, relative to the total amount (100 parts by weight) of the component (A) and the component (B).

Furthermore, it is more preferable that the content of the component (D) is adjusted to a value of 1.5 parts by weight or less, and even more preferably to a value of 1 part by weight or less, relative to the total amount (100 parts by weight) of the component (A) and the component (B).

(5) Other Additives

Other additives can also be added as appropriate, to the extent that the effects of the invention are not impaired.

Examples of the other additives include an oxidation inhibitor, an antistatic agent, a polymerization accelerator, a polymerization inhibitor, an infrared absorber, a plasticizer, a diluent solvent, and a leveling agent.

Meanwhile, generally, the content of the other additives is preferably adjusted to a value within the range of 0.01 to 5 parts by weight relative to the total amount (100 parts by weight) of the component (A) and the component (B).

2. Step (b): Application Step

Figure 6A:
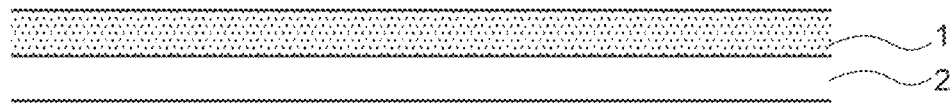
FIGS. 6(a) to 6(c) are diagrams provided to explain the method for manufacturing an optical diffusion film of the invention.

Step (b) is a step of applying the composition for an optical diffusion film thus prepared on a process sheet 2, and forming a coating layer 1, as illustrated in FIG. 6(a).

Regarding the process sheet, a plastic film and paper can both be used.

Above all, examples of the plastic film include a polyester-based film such as a polyethylene terephthalate film; a polyolefin-based film such as a polyethylene film or a polypropylene film; a cellulose-based film such as a triacetyl cellulose film; and a polyimide-based film.

Examples of the paper include glassine paper, coated paper, and laminated paper.

When the steps that will be described below are considered, the process sheet 2 is preferably a film having excellent dimensional stability against heat or active energy radiation.

Regarding such a film, among those mentioned above, a polyester-based film, a polyolefin-based film, and a polyimide-based film may be preferably used.

Furthermore, in regard to the process sheet, in order to allow easy detachment of the optical diffusion film thus obtained from the process sheet after photocuring, it is preferable to provide a release layer on the surface that has been coated with the composition for an optical diffusion film in the process sheet.

Such a release layer can be formed using a conventionally known release agent such as a silicone-based release agent, a fluorine-based release agent, an alkyd-based release agent, or an olefin-based release agent.

Usually, the thickness of the process sheet is preferably adjusted to a value within the range of 25 to 200 µm.

Regarding the method of applying a composition for an optical diffusion film on a process sheet, for example, application can be performed by a conventionally known method such as a knife coating method, a roll coating method, a bar coating method, a blade coating method, a die coating method, or a gravure coating method.

At this time, the thickness of the coating layer is preferably adjusted to a value within the range of 10 to 700 µm.

3. Step (c): First Active Energy Ray Irradiation Step

Figure 6B:
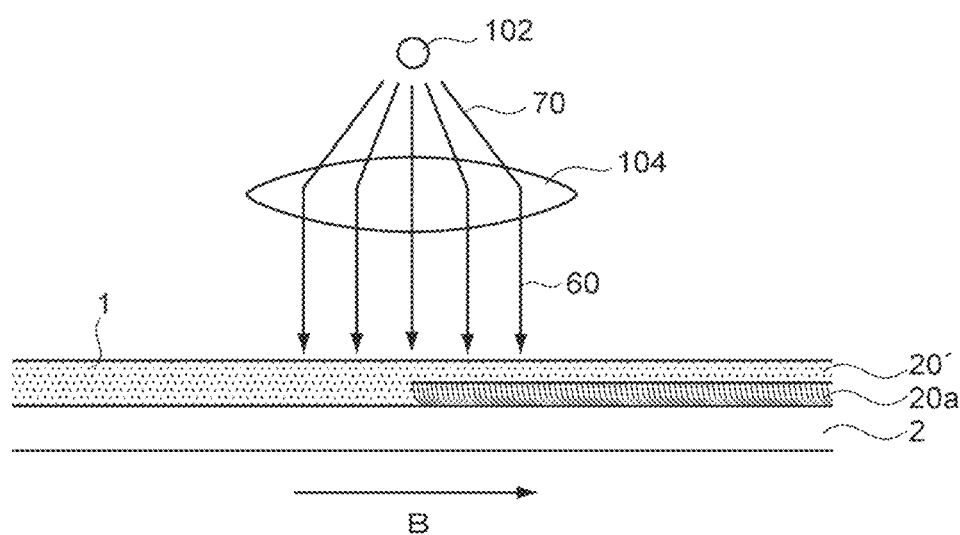
Figure 6C:
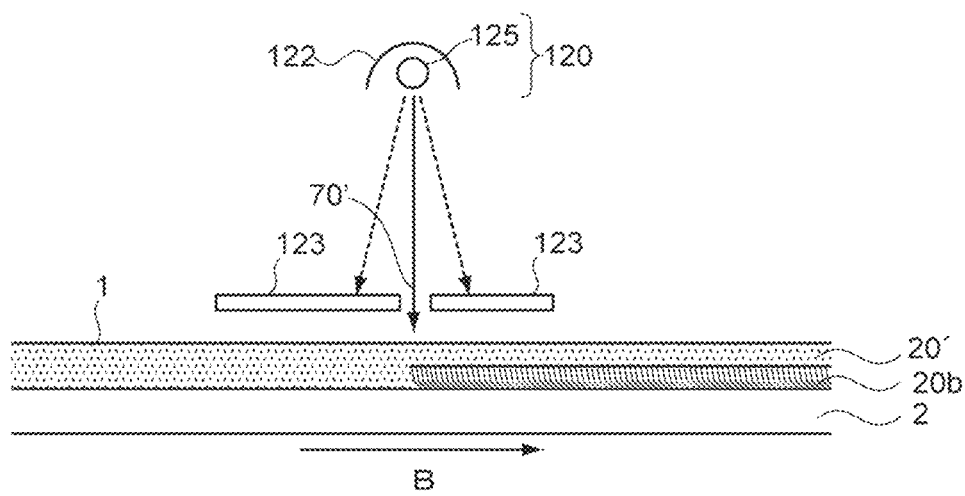

Step (c) is a step of subjecting the coating layer 1 to first irradiation with active energy radiation, thus forming a first internal structure 20 in the lower portion of the coating layer 1, and also leaving a region 20' where an internal structure is not formed, in the upper portion of the coating layer 1, as illustrated in FIGS. 6(b) and 6(c).

In the following description, the first active energy ray irradiation step will be explained, separately for the case of forming a bent columnar structure and the case of forming a bent louver structure.

(1) In Case of Forming Bent Columnar Structure

In a case in which a bent columnar structure is formed as a first internal structure, as illustrated in FIG. 6(b), the coating layer 1 formed on the process sheet is irradiated with parallel light 60 having a high degree of parallelism of light rays as the light for irradiation.

Here, the term parallel light means light in which the direction of emitted light is substantially parallel without any expansion even if viewed from any direction.

Specifically, it is preferable that the degree of parallelism of the light for irradiation is set to a value of 10° or less.

The reason for this is that when the degree of parallelism of the light for irradiation is set to a value within such a range, a bent columnar structure in which a plurality of pillar-shaped objects are arranged so as to stand closes together at a certain angle of inclination in the film thickness direction, can be formed efficiently and stably.

Therefore, it is more preferable that the degree of parallelism of the light for irradiation is adjusted to a value of 5° or less, and even more preferably to a value of 2° or less.

Figure 7:
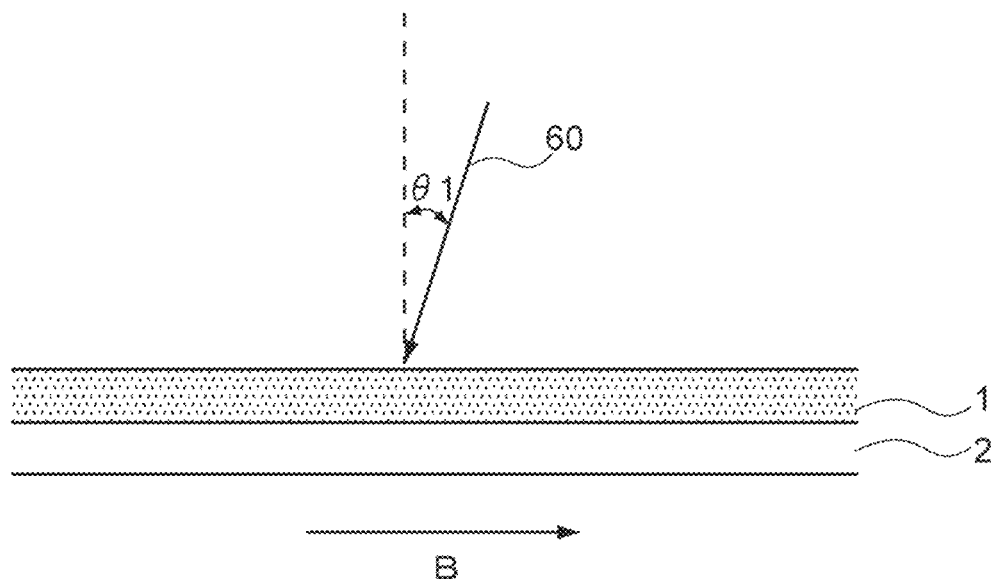
FIG. 7 is a diagram provided to explain the angle of irradiation with active energy radiation.

Regarding the angle of irradiation of the light for irradiation, as illustrated in FIG. 7, it is preferable that the angle of irradiation θ1 obtainable in a case in which the angle of the normal line with respect to the surface of the coating layer 1 is designated as 0°, is adjusted to a value within the range of, usually, −80° to 80°.

The reason for this is that if the angle of irradiation has a value that is not in the range of −80° to 80°, the influence of reflection or the like at the surface of the coating layer 1 may become significant, and it may be difficult to form a satisfactory bent columnar structure.

Meanwhile, arrow B in FIG. 7 represents the direction of movement of the coating layer.

Regarding the light for irradiation, it is preferable to use ultraviolet radiation.

The reason for this is that in the case of an electron beam, since the rate of polymerization is very fast, the component (A) and the component (B) may not be able to sufficiently undergo phase separation during the course of polymerization, and it may be difficult to form a bent columnar structure. On the other hand, it is because when compared to visible light or the like, ultraviolet radiation is associated with a rich variety of ultraviolet-curable resins that are cured when irradiated with ultraviolet radiation, or a rich variety of photopolymerization initiators that can be used, and therefore, the ranges of selection for the component (A) and the component (B) can be further widened.

Furthermore, regarding the conditions for the first irradiation with active energy radiation, it is preferable that the peak illuminance at the coating layer surface is adjusted to a value within the range of 0.1 to 3 $mW/cm^2$.

The reason for this is that if such peak illuminance has a value of below 0.1 $mW/cm^2$, a sufficient region where an internal structure is not formed can be secured; however, it may be difficult to form a distinct bent columnar structure. On the other hand, it is because if the peak illuminance has a value of above 3 $mW/cm^2$, even if there exists a region where an internal structure is not formed, it is speculated that the curing reaction in the relevant region may excessively proceed, and thus, it may be difficult to satisfactorily form a second internal structure during the second active energy ray irradiation step that will be described below.

Therefore, it is more preferable that the peak illuminance at the coating layer surface during the first irradiation with active energy radiation is adjusted to a value of 0.3 $mW/cm^2$ or more, and even more preferably to a value of 0.5 $mW/cm^2$ or more.

It is also more preferable that the peak illuminance at the coating layer surface during the first irradiation with active energy radiation is adjusted to a value of 2 $mW/cm^2$ or less, and even more preferably to a value of 1.5 $mW/cm^2$ or less.

Furthermore, it is preferable that the cumulative amount of light at the coating layer surface during the first irradiation with active energy radiation is adjusted to a value within the range of 5 to 100 $mJ/cm^2$.

The reason for this is that if the cumulative amount of light has a value of below 5 $mJ/cm^2$, it may be difficult to sufficiently extend the bent columnar structure from the upper side toward the lower part, or when the second internal structure is formed, the bent columnar structure may be deformed. On the other hand, it is because if the cumulative amount of light has a value of above 100 $mJ/cm^2$, curing of the region where an internal structure is not formed may excessively proceed, and during the second active energy ray irradiation step that will be described below, it may be difficult to satisfactorily form the second internal structure.

Therefore, it is more preferable that the cumulative amount of light at the coating layer surface during the first irradiation with active energy radiation is adjusted to a value of 7 $mJ/cm^2$ or more, and even more preferably to a value of 10 $mJ/cm^2$ or more.

It is also more preferable that the cumulative amount of light at the coating layer surface during the first irradiation with active energy radiation is adjusted to a value of 50 $mJ/cm^2$ or less, and even more preferably to a value of 30 $mJ/cm^2$ or less.

Furthermore, from the viewpoint of stably forming a bent columnar structure while maintaining mass productivity, it is preferable that when the first irradiation with active energy radiation is performed, the coating layer formed on the process sheet is moved at a rate within the range of 0.1 to 10 m/min.

Particularly, it is more preferable that the coating layer is moved at a rate of 0.2 m/min or more, and even more preferably at a rate of 3 m/min or less.

Furthermore, from the viewpoint of efficiently leaving the region where an internal structure is not formed, the first active energy ray irradiation step is performed in an oxygen-containing atmosphere (preferably, in an air atmosphere).

The reason for this is that when the first irradiation with active energy radiation is performed in an oxygen-containing atmosphere, while a bent columnar structure is efficiently formed in the lower portion of the coating layer, the region where a internal structure is not formed can be stably caused to remain in the upper portion of the coating layer by utilizing the influence of oxygen inhibition.

That is, it is because if the first irradiation with active energy radiation is performed not in an oxygen-containing atmosphere, but in a non-oxygen atmosphere that does not contain oxygen, a bent columnar structure may be formed continuously almost up to the edge surface of the film, without leaving the region where an internal structure is not formed in the upper part of the film.

Meanwhile, the phrase "in an oxygen-containing atmosphere" means the conditions in which the top face of the coating layer is in direct contact with a gas containing oxygen, such as air. Above all, the phrase "in an air atmosphere" means the conditions in which the top face of the coating layer is in direct contact with air.

Therefore, performing the first irradiation with active energy radiation in a state in which the top face of the coating layer is directly exposed to air without implementing particular means such as lamination of a film on the top face of the coating layer or purging of the atmosphere with nitrogen, corresponds to the first irradiation with active energy radiation "in an air atmosphere".

(2) In Case of Forming Bent Louver Structure

In a case in which a bent louver structure is formed as the first internal structure, as illustrated in FIG. 6(c), the coating layer 1 formed on the process sheet is irradiated with light that is substantially parallel light when viewed from one direction but appears as non-parallel random light when viewed from another direction.

Such light can be radiated using, for example, a linear light source 125, and in this case, the light appears as substantially parallel light when viewed from the axial direction of the linear light source 125, but appears as non-parallel random light 70' when viewed from another direction.

Meanwhile, other conditions for irradiation are equivalent to the conditions applicable to "In case of forming bent columnar structure" as described above, and therefore, further description thereon will not be given here.

4. Step (d): Second Active Energy Ray Irradiation Step

Step (d) is a step of further subjecting the coating layer to second irradiation with active energy radiation, and forming a second internal structure in the region where an internal structure is not formed.

The second active energy ray irradiation step as such can be performed basically in the same manner as in the first active energy ray irradiation step.

Therefore, in a case in which a columnar structure is formed as the second internal structure in the second active energy ray irradiation step, as illustrated in FIG. 6(b), it is desirable to irradiate the optical diffusion film with parallel light. In a case in which a louver structure is formed as the second internal structure, as illustrated in FIG. 6(c), it is desirable to irradiate the optical diffusion film with light that is substantially parallel light when viewed from one direction but appears as non-parallel random light when viewed from another direction.

Furthermore, regarding the conditions for the second irradiation with active energy radiation, it is preferable that the peak illuminance at the coating layer surface is adjusted to a value within the range of 0.1 to 20 mW/cm$^2$.

The reason for this is that if the peak illuminance has a value of below 0.1 mW/cm$^2$, it may be difficult to form a distinct second internal structure. On the other hand, it is because if such illuminance has a value of above 20 mW/cm$^2$, it is speculated that the curing rate becomes too fast, and the second internal structure may not be effectively formed.

Therefore, it is more preferable that the peak illuminance at the coating layer surface during the second irradiation with active energy radiation is adjusted to a value of 0.3 mW/cm$^2$ or more, and even more preferably to a value of 0.5 mW/cm$^2$ or more.

It is also more preferable that the peak illuminance at the coating layer surface during the second irradiation with active energy radiation is adjusted to a value of 10 mW/cm$^2$ or less, and even more preferably to a value of 5 mW/cm$^2$ or less.

Furthermore, it is preferable that the cumulative amount of light at the coating layer surface during the second irradiation with active energy radiation is adjusted to a value within the range of 5 to 300 mJ/cm$^2$.

The reason for this is that if the cumulative amount of light has a value of below 5 mJ/cm$^2$, it may be difficult to sufficiently extend the second internal structure from the upper side toward the lower part. On the other hand, it is because if the cumulative amount of light has a value of above 300 mJ/cm$^2$, coloration may occur in the resulting film.

Therefore, it is more preferable that the cumulative amount of light at the coating layer surface during the second irradiation with active energy radiation is adjusted to a value of 10 mJ/cm$^2$ or more, and even more preferably to a value of 20 mJ/cm$^2$ or more.

Furthermore, it is more preferable that the cumulative amount of light at the coating layer surface during the second irradiation with active energy radiation is adjusted to a value of 200 mJ/cm$^2$ or less, and even more preferably to a value of 150 mJ/cm$^2$ or less.

It is also preferable that the second irradiation with active energy radiation is performed in a non-oxygen atmosphere.

The reason for this is that when the second irradiation with active energy radiation is performed in a non-oxygen atmosphere, the influence of oxygen inhibition is suppressed in the region where an internal structure is not formed, which is obtained by the first irradiation with active energy radiation, and thereby a second internal structure can be formed efficiently.

That is, it is because if the second irradiation with active energy radiation is performed not in a non-oxygen atmosphere but in an oxygen atmosphere, when the optical diffusion film is irradiated at a high illuminance, the second internal structure could be formed at a very shallow position in the vicinity of the surface; however, the difference in refractive index needed for optical diffusion may not be obtained. Furthermore, it is because when the optical diffusion film is irradiated at a low illuminance, the second internal structure may not be formed in the region where an internal structure is not formed, under the influence of oxygen inhibition.

The phrase "in a non-oxygen atmosphere" means the conditions in which the top face of the coating layer is not in direct contact with an oxygen atmosphere or an atmosphere containing oxygen.

Therefore, for example, performing the second irradiation with active energy radiation in a state in which a film is laminated on the top face of the coating layer, or nitrogen purge is performed by replacing air with nitrogen gas, corresponds to the second irradiation with active energy radiation in the "non-oxygen atmosphere".

As discussed above, according to the present invention, since a first internal structure and a second internal structure are formed by first irradiation with active energy radiation and second irradiation with active energy radiation, respectively, the combination of the angles of inclination of the regions having a relatively high refractive index in the respective internal structures can be easily regulated.

That is, only by appropriately adjusting the angle of irradiation for each of the active energy ray irradiation processes, the combination of the angles of inclination of the regions having a relatively high refractive index in the respective internal structures can be easily regulated.

EXAMPLES

Hereinafter, the invention will be described in more detail by way of Examples.

Example 1

1. Synthesis of Component (B): Low Refractive Index Polymerizable Compound

One mol of a polypropylene glycol (PPG) having a weight average molecular weight of 9,200, 2 mol of isophorone diisocyanate (IPDI), and 2 mol of 2-hydroxyethyl methacrylate (HEMA) were introduced into a vessel, and the mixture was allowed to react according to a conventional method. Thus, a polyether urethane methacrylate having a weight average molecular weight of 9,900 was obtained.

The weight average molecular weights of the polypropylene glycol and the polyether urethane methacrylate are values measured by gel permeation chromatography (GPC) under the conditions described below, and calculated relative to polystyrene standards.

GPC analyzer: manufactured by Tosoh Corp., HLC-8020

GPC column: manufactured by Tosoh Corp. (described below in the order of passage)

TSK guard column HXL-H
TSK gel GMHXL (x2)
TSK gel G2000HXL

Analytic solvent: tetrahydrofuran

Analysis temperature: 40° C.

2. Production of Composition for Optical Diffusion Film

Next, 100 parts by weight of the polyether urethane methacrylate having a weight average molecular weight of 9,900 thus obtained as component (B) was mixed with 150 parts by weight of o-phenylphenoxyethoxyethyl acrylate represented by Formula (3) described above and having a molecular weight of 268 (manufactured by Shin Nakamura Chemical Co., Ltd., NK ESTER A-LEN-10) as component (A), 20 parts by weight (8 parts by weight relative to the total amount (100 parts by weight) of component (A) and component (B)) of 2-hydroxy-2-methylpropiophenone as component (C), and 0.5 parts by weight (0.2 parts by weight relative to the total amount (100 parts by weight) of component (A) and component (B)) of a benzotriazole-based ultraviolet absorber (manufactured by BASF SE, TINUVIN 384-2) as component (D), and then heating and mixing was performed under the conditions of 80° C. Thus, a composition for an optical diffusion film was obtained.

The refractive indices of the component (A) and the component (B) were measured according to JIS K0062 using an Abbe refractometer (manufactured by Atago Co., Ltd., Abbe refractometer DR-M2, Na light source, wavelength 589 nm), and the refractive indices were 1.58 and 1.46, respectively.

3. Coating Process

Next, the composition for an optical diffusion film thus obtained was applied on a film-like transparent polyethylene terephthalate (hereinafter, referred to as PET) as a process sheet, and a coating layer having a film thickness of 198 μm was formed.

4. First Irradiation with Ultraviolet Radiation

Next, the coating layer was irradiated with parallel light having a degree of parallelism of 2° or less using an ultraviolet spot parallel light source (manufactured by Jatec Co., Ltd.), in which the degree of parallelism of central light was controlled to be ±3° or less, such that the angle of irradiation θ1 as illustrated in FIG. 7 would be almost 20°.

The peak illuminance employed at that time was 1.18 mW/cm$^2$, the cumulative amount of light was 24.1 mJ/cm$^2$, the lamp height was 240 mm, and the speed of movement of the coating layer was 0.2 m/min.

5. Second Irradiation with Ultraviolet Radiation

Next, after the first ultraviolet irradiation process was completed, a release film having ultraviolet transmissibility (manufactured by Lintec Corp., SP-PET382050) and having a thickness of 38 μm was laminated on the exposed surface side of the coating layer, and the resultant was subjected to a non-oxygen atmosphere.

Next, similarly to the first ultraviolet irradiation process, the coating layer was irradiated with parallel light having a degree of parallelism of 2° or less, over the release film from the same side as that used in the first ultraviolet irradiation process, such that the angle of irradiation θ1 as illustrated in FIG. 7 would be almost 0°. Thus, an optical diffusion film having a film thickness of 198 μm was obtained.

The peak illuminance at that time was 1.26 mW/cm$^2$, the cumulative amount of light was 22.4 mJ/cm$^2$, the lamp height was 240 mm, and the speed of movement of the coating layer was 0.2 m/min.

Meanwhile, the peak illuminance and the cumulative amount of light described above were measured by installing a UV meter (manufactured by Eye Graphics Co., Ltd., EYE ultraviolet cumulative illuminometer UVPF-A1) equipped with a light collector at the position of the coating layer.

Furthermore, the film thickness of the optical diffusion film was measured using a constant pressure thickness analyzer (manufactured by Takara Co., Ltd., TECLOCK PG-02J).

Figure 8A:
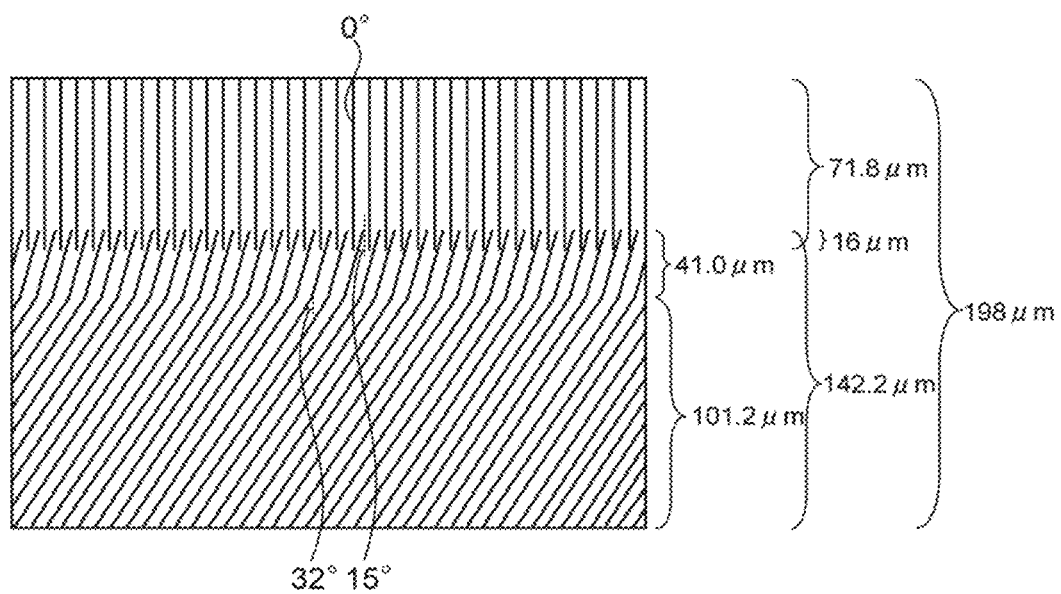
FIGS. 8(a) and 8(b) are a schematic diagram and a photograph of a cross-section in the optical diffusion film of Example 1.
Figure 8B:
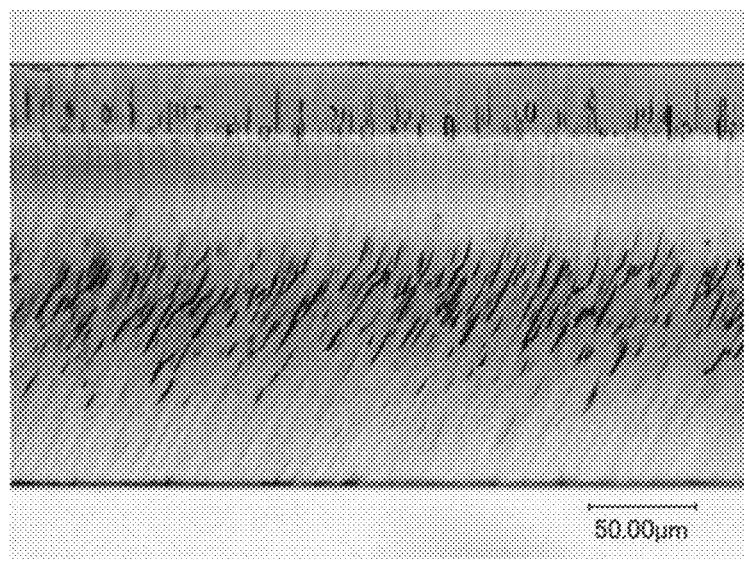

Furthermore, a schematic diagram of a cross-section obtained by cutting the optical diffusion film thus obtained, at a plane that is parallel to the direction of movement of the coating layer and orthogonally intersects the film plane, is shown in FIG. 8(a), and a photograph of the cross-section is shown in FIG. 8(b).

As illustrated in FIG. 8(a), the length L1 of the first columnar structure was 142.2 μm, and in the first columnar structure as such, the length La of the portion upper than the bent section was 41.0 μm, while the angle of inclination thereof θa was 15°.

Furthermore, in the first columnar structure, the length Lb of the portion lower than the bent section was 101.2 μm, and the angle of inclination thereof θb was 32°.

The absolute value of θb−θa was 17°.

Furthermore, the length L2 of the second columnar structure was 71.8 μm, and the angle of inclination θc was 0°.

Moreover, there existed an overlapping columnar structure (overlapping internal structure) in which the tips of pillar-shaped objects originating from the second columnar structure were brought into contact with the vicinity of the tips of pillar-shaped objects originating from the first columnar structure, and the length L3 of the overlapping columnar structure was 16 μm.

The absolute value of θa−θc in the overlapping internal structure was 15°.

Cutting of the optical diffusion film was performed using a razor, and photographing of a cross-section was performed by reflective observation using a digital microscope (manufactured by Keyence Corp., VHX-2000).

In the schematic diagram of FIG. 8(a), high refractive index regions in the internal structure are represented by solid lines (hereinafter, the same).

6. Evaluation of Optical Diffusion Characteristics

The optical diffusion characteristics of the optical diffusion film thus obtained were evaluated.

Namely, a pressure-sensitive adhesive layer was provided on the surface of the release film of the optical diffusion film obtained in a state of being interposed between a PET film and a release film, and the optical diffusion film was adhered to a soda lime glass having a thickness of 1.1 mm. This was used as a specimen for evaluation.

Figure 9A:
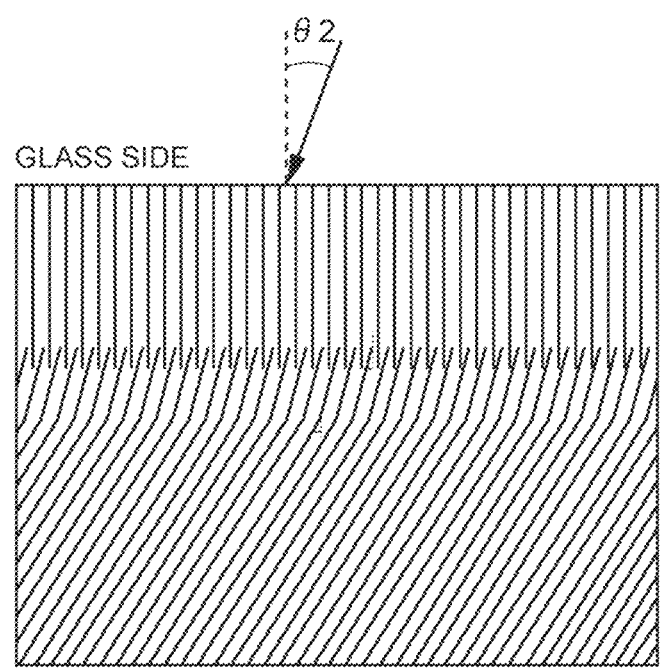
FIGS. 9(a) and 9(b) are diagrams provided to explain the angle of incidence θ2 with respect to the optical diffusion film when optical diffusion characteristics are measured.

Next, light was caused to enter into the optical diffusion film through the glass side of the specimen, that is, through the second internal structure side, as illustrated in FIG. 9, using a conoscope (manufactured by autronic-MELCHERS GmbH), while the incident angle θ2 (°) was varied to 0°, 10°, 20°, 30°, 40°, 50°, and 60°. The conoscopic images thus obtained are presented in FIGS. 10(a) to 10(g).

From the results, since diffusion of the incident light occurred even in a case in which the incident angle θ2 of the incident light was varied from 0° to 60°, it is understood that the optical diffusion film has a wide optical diffusion incident angle region including at least from 0° to 60°.

Furthermore, although there is variation in the shape or intensity distribution of diffused light depending on the incident angle, crescent-shaped diffusion with an extremely narrow width or circular-shaped diffusion with an extremely small radius, which indicates that diffusion is insufficient, does not occur. Therefore, it is understood that changes in the optical diffusion characteristics are effectively suppressed.

Example 2

In Example 2, an optical diffusion film was manufactured in the same manner as in Example 1, except that when the composition for an optical diffusion film was manufactured, the type of the ultraviolet absorber as the component (D) was changed to TINUVIN 477 manufactured by BASF SE, which is a mixed product of hydroxyphenyltriazine-based ultraviolet absorbers, the amount of addition thereof was changed to 0.1 parts by weight relative to 100 parts by weight in total of the component (A) and the component (B), and the film thickness of the optical diffusion film was changed to 194 μm. The results thus obtained are presented in FIGS. 11(a) and 11(b).

Figure 11A:
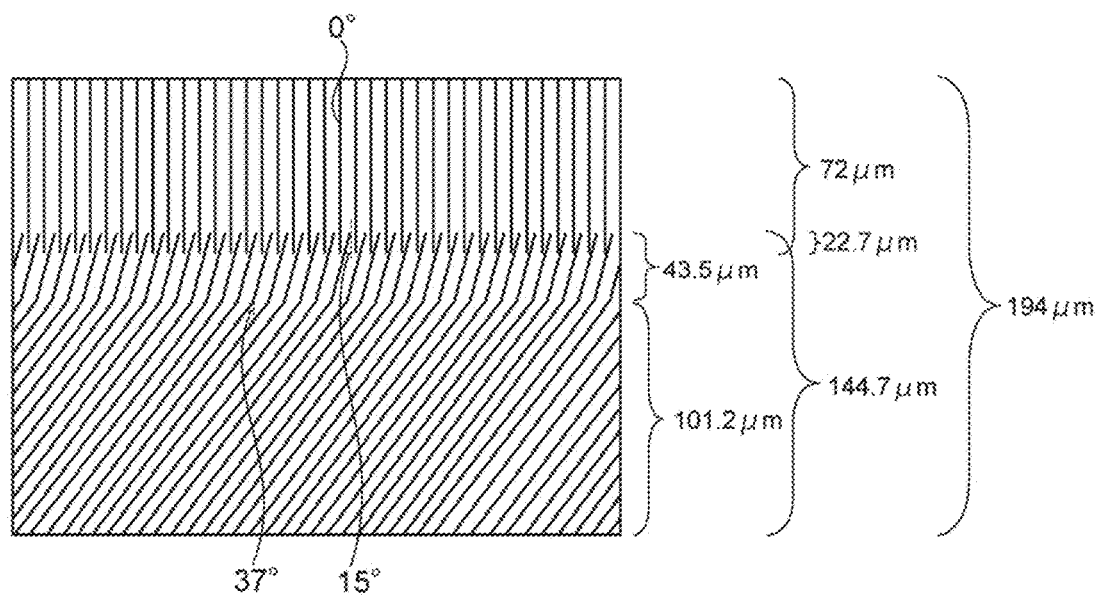
FIGS. 11(a) and 11(b) are a schematic diagram and a photograph of a cross-section in the optical diffusion film of Example 2.
Figure 11B:
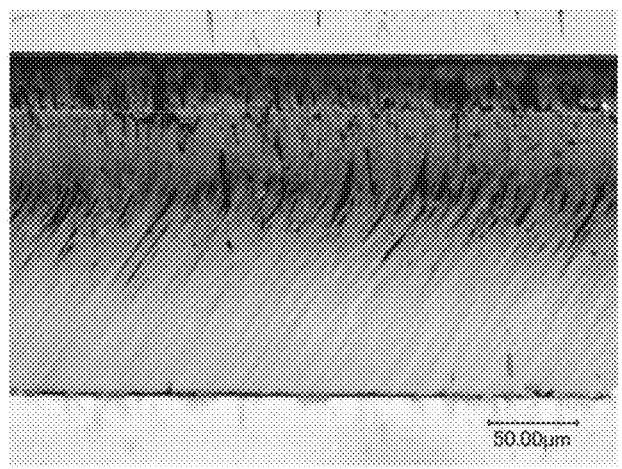
Figure 12A:
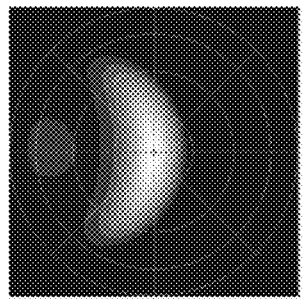
FIGS. 12(a) to 12(g) are diagrams provided to explain the optical diffusion characteristics of the optical diffusion film of Example 2.
Figure 12B:
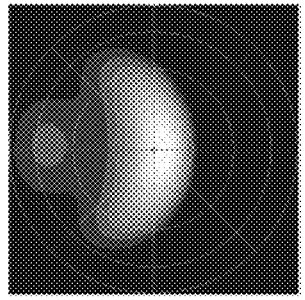
Figure 12C:
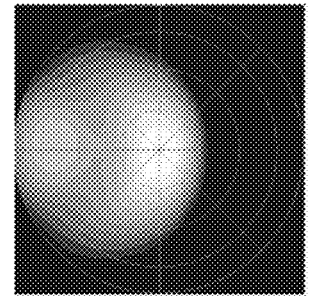
Figure 12D:
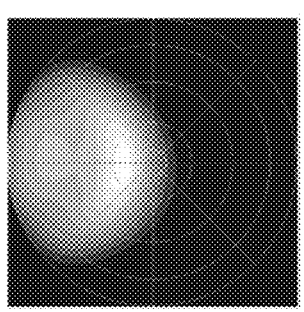
Figure 12E:
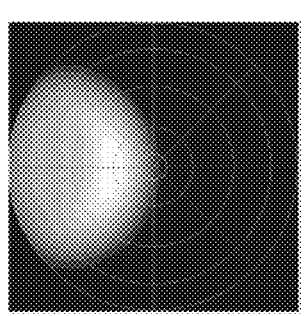
Figure 12F:
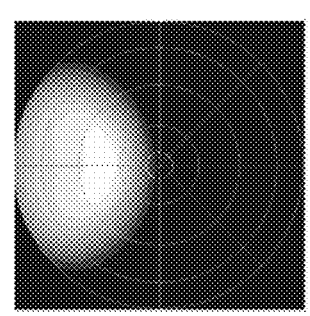
Figure 12G:
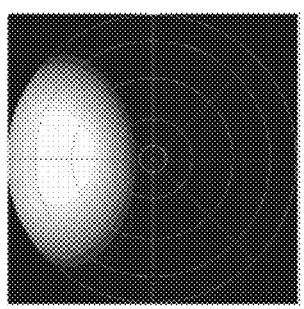

FIG. 11(a) is a schematic diagram of a cross-section obtained by cutting the optical diffusion film thus obtained, at a plane that was parallel to the direction of movement of the coating layer and orthogonally intersected the film plane. FIG. 11(b) is a photograph of the cross-section.

Furthermore, as illustrated in FIG. 11(a), the length L1 of the first columnar structure was 144.7 μm, and in the first columnar structure as such, the length La of the portion upper than the bent section was 43.5 μm, while the angle of inclination θa was 15°.

In the first columnar structure, the length Lb of the portion lower than the bent section was 101.2 μm, and the angle of inclination θb was 37°.

The absolute value of θb−θa was 22°.

Furthermore, the length L2 of the second columnar structure was 72 μm, and the angle of inclination θc was 0°.

Moreover, there existed an overlapping columnar structure (overlapping internal structure) in which the tips of pillar-shaped objects originating from the second columnar structure were brought into contact with the vicinity of the tips of pillar-shaped objects originating from the first columnar structure, and the length L3 was 22.7 μm.

The absolute value of θa−θc in the overlapping internal structure was 15°.

The optical diffusion characteristics of the optical diffusion film thus obtained were evaluated in the same manner as in Example 1. Conoscopic images thus obtained are presented in FIGS. 12(a) to 12(g).

From the results, since diffusion of the incident light occurred even in a case in which the incident angle θ2 of the incident light was varied from 0° to 60°, it is understood that the optical diffusion film has a wide optical diffusion incident angle region including at least from 0° to 60°.

Furthermore, although there is variation in the shape or intensity distribution of diffused light depending on the incident angle, crescent-shaped diffusion with an extremely narrow width or circular-shaped diffusion with an extremely small radius, which indicates that diffusion is insufficient, does not occur. Therefore, it is understood that changes in the optical diffusion characteristics are effectively suppressed.

Example 3

In Example 3, when the composition for an optical diffusion film was manufactured, the type of the ultraviolet absorber as the component (D) was changed to TINUVIN 477 manufactured by BASF SE, which is a mixed product of hydroxyphenyltriazine-based ultraviolet absorbers, the amount of addition of the ultraviolet absorber was set to 0.1 parts by weight relative to 100 parts by weight in total of the component (A) and the component (B), and the film thickness of the optical diffusion film was adjusted to 190 μm.

As the first ultraviolet irradiation, as illustrated in FIG. 6(c), a linear light source 125 was used, and the coating layer 1 was irradiated with light that was substantially parallel light when viewed from the axial direction of the linear light source 125 but appeared as non-parallel random light 70' when viewed from another direction, such that the angle of irradiation θ1 as illustrated in FIG. 7 would be almost 20°.

The peak illuminance at that time was 21.95 mW/cm², the cumulative amount of light was 24.65 mJ/cm², the lamp height was 500 mm, and the speed of movement of the coating layer was 0.2 m/min.

Also, after the first ultraviolet irradiation process was completed, a release film having ultraviolet transmissibility (manufactured by Lintec Corp., SP-PET382050) and having a thickness of 38 μm was laminated on the exposed surface side of the coating layer, and the resultant was subjected to a non-oxygen atmosphere.

Next, as the second ultraviolet irradiation, similarly to the first ultraviolet irradiation process, the coating layer was irradiated using a linear light source, such that the angle of inclination θ1 as illustrated in FIG. 7 would be almost 0°.

The peak illuminance at that time was 1.24 mW/cm², the cumulative amount of light was 44.35 mJ/cm², the lamp height was 500 mm, and the speed of movement of the coating layer was 0.2 m/min.

Except for these, an optical diffusion film was manufactured in the same manner as in Example 1. The results thus obtained are presented in FIGS. 13(a) and 13(b).

Figure 13A:
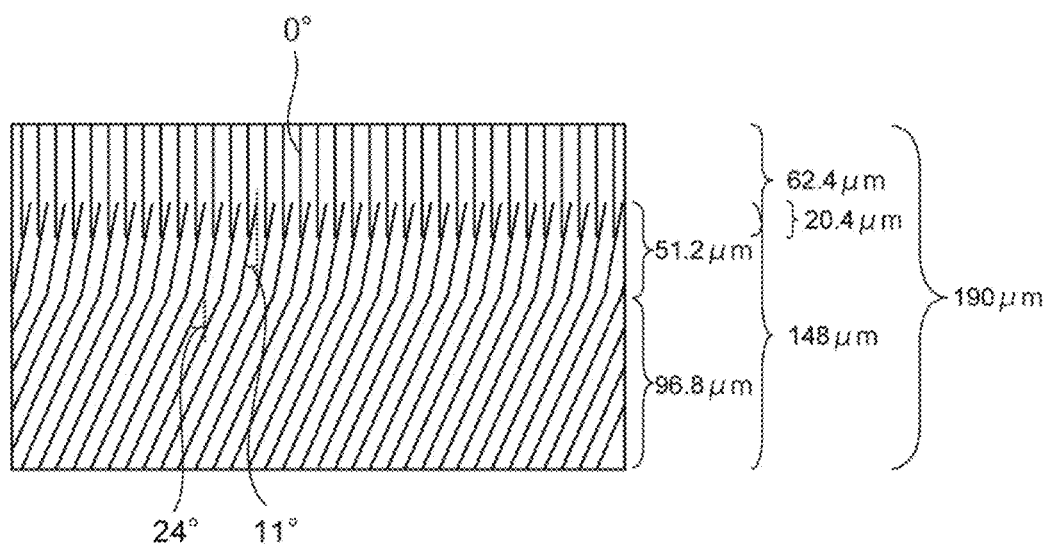
FIGS. 13(a) and 13(b) are a schematic diagram and a photograph of a cross-section in the optical diffusion film of Example 3.
Figure 13B:
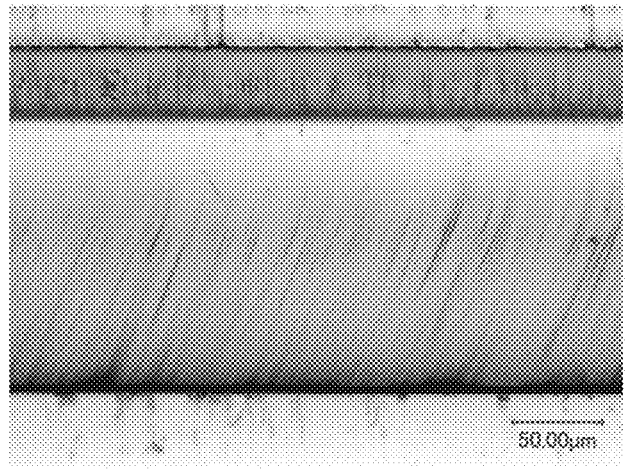
Figure 14A:
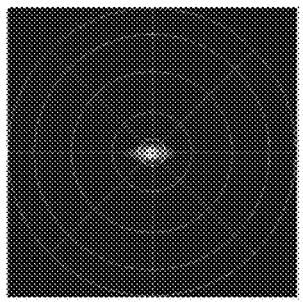
FIGS. 14(a) to 14(g) are diagrams provided to explain the optical diffusion characteristics of the optical diffusion film of Example 3.
Figure 14B:
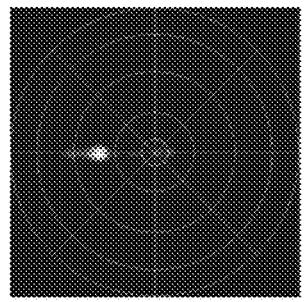
Figure 14C:
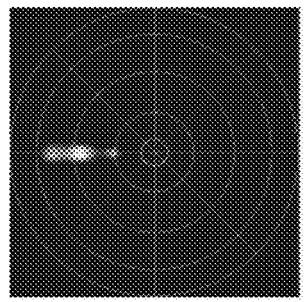
Figure 14D:
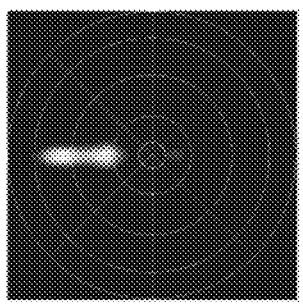
Figure 14E:
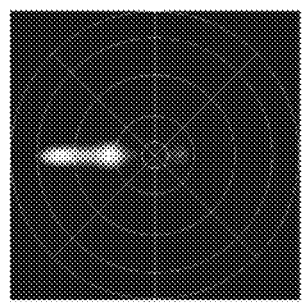
Figure 14F:
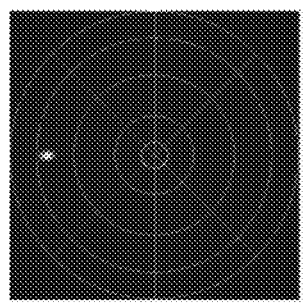
Figure 14G:
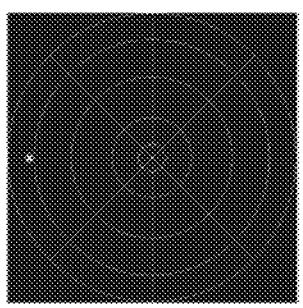

FIG. 13(a) is a schematic diagram of a cross-section obtained by cutting the optical diffusion film thus obtained, at a plane that is parallel to the direction of movement of the coating layer and orthogonally intersects the film plane, and FIG. 13(b) is a photograph of the cross-section of the optical diffusion film.

Furthermore, as illustrated in FIG. 13(a), the length L1 of the first louver structure was 148 μm, and in the first louver structure as such, the length La of the portion upper than the bent section was 51.2 μm, while the angle of inclination θa was 11°.

In the first louver structure, the length Lb of the portion lower than the bent section was 96.8 μm, and the angle of inclination θb was 24°.

The absolute value of θb−θa was 13°.

The length L of the second louver structure was 62.4 μm, and the angle of inclination θc was 0°.

Moreover, there existed an overlapping louver structure (overlapping internal structure) in which the tips of high refractive index plate-shaped regions originating from the second louver structure were brought into contact with the vicinity of the tips of high refractive index plate-shaped objects originating from the first louver structure, and the length L3 was 20.4 μm.

The absolute value of θa−θc in the overlapping internal structure was 11°.

Figure 9B:
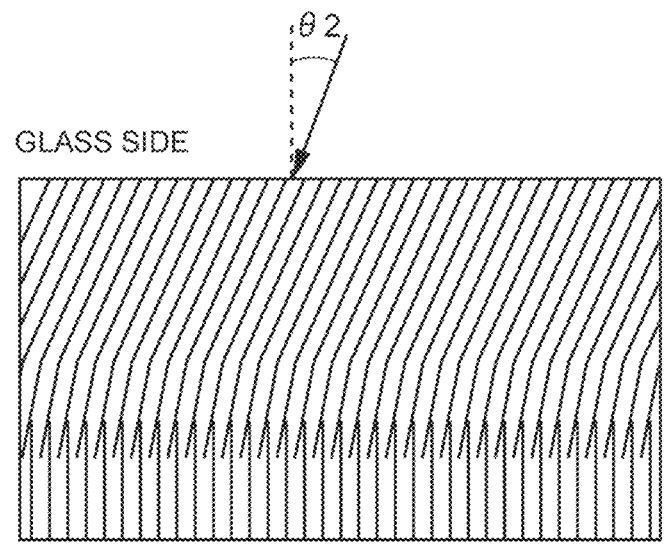
Figure 10A:
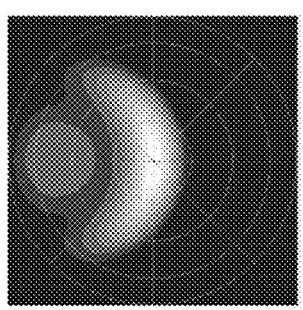
FIGS. 10(a) to 10(g) are diagrams provided to explain the optical diffusion characteristics in the optical diffusion film of Example 1.
Figure 10B:
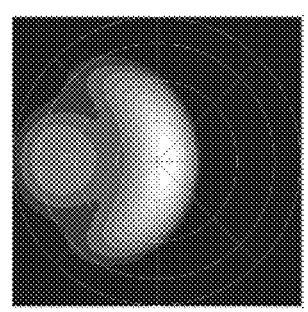
Figure 10C:
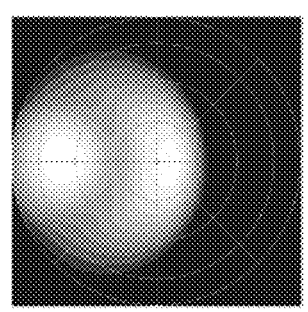
Figure 10D:
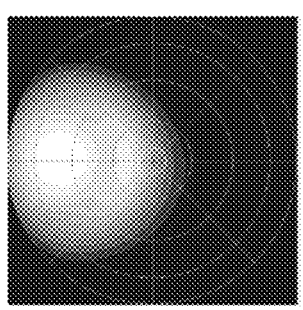
Figure 10E:
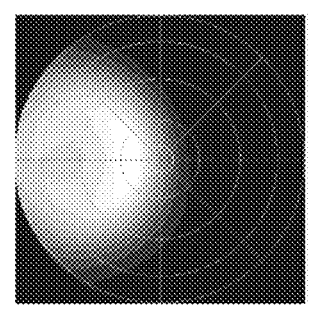
Figure 10F:
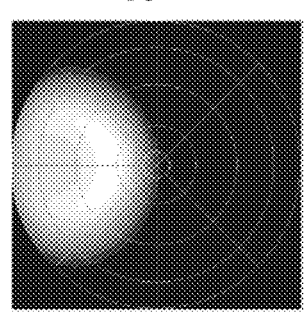
Figure 10G:
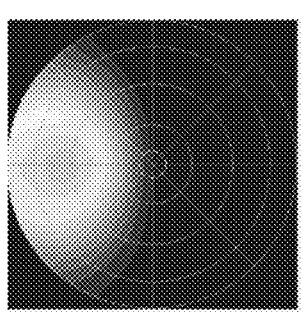

The optical diffusion characteristics of the optical diffusion film thus obtained were evaluated in the same manner as in Example 1, except that incident light was caused to enter the optical diffusion film through the first internal structure side as illustrated in FIG. 9(b). Conoscopic images thus obtained are presented in FIGS. 14(a) to 14(g).

From the results, since diffusion of the incident light occurred even in a case in which the incident angle θ2 of the incident light was varied from 0° to 40°, it is understood that the optical diffusion film has a wide optical diffusion incident angle region including at least from 0° to 40°.

Furthermore, although there is variation in the shape or intensity distribution of diffused light depending on the incident angle, point-like diffusion which indicates that diffusion is insufficient and incident light is almost transmitted, does not occur. Therefore, it is understood that changes in the optical diffusion characteristics are effectively suppressed.

Comparative Example 1

In Comparative Example 1, an optical diffusion film was manufactured in the same manner as in Example 1, except that when the composition for an optical diffusion film was manufactured, an ultraviolet absorber as the component (D) was not added, and the film thickness of the optical diffusion film was adjusted to 198 μm. The results thus obtained are presented in FIGS. 15(a) and 15(b).

Figure 15A:
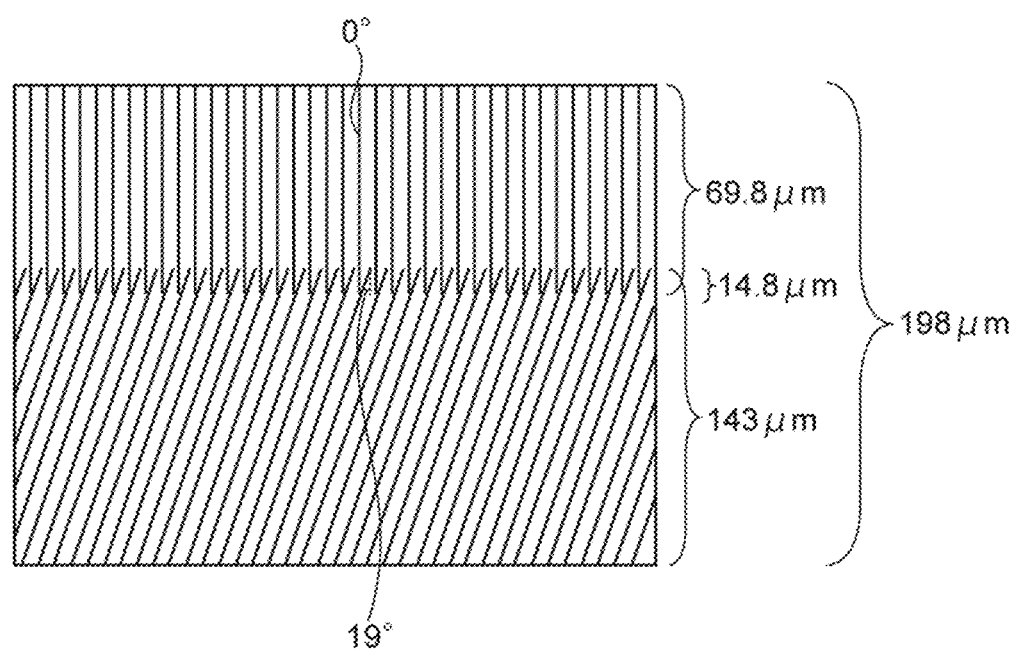
FIGS. 15(a) and 15(b) are a schematic diagram and a photograph of a cross-section of the optical diffusion film of Comparative Example 1.
Figure 15B:
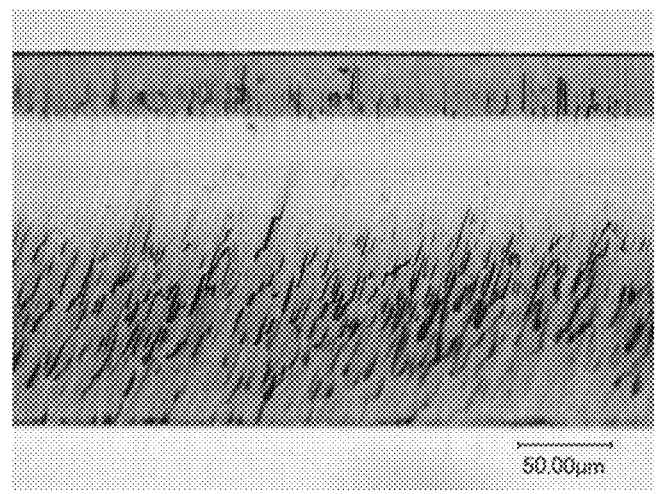
Figure 16A:
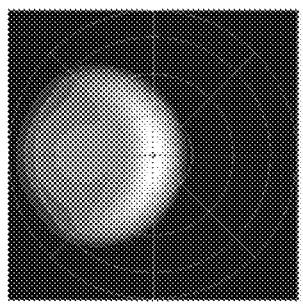
FIGS. 16(a) to 16(g) are diagrams provided to explain the optical diffusion characteristics of the optical diffusion film of Comparative Example 1.
Figure 16B:
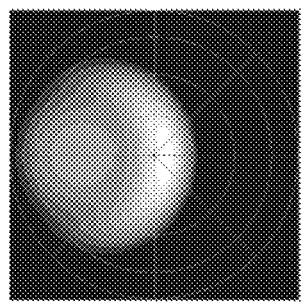
Figure 16C:
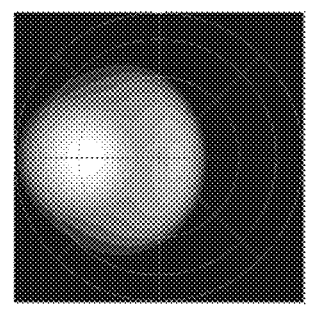
Figure 16D:
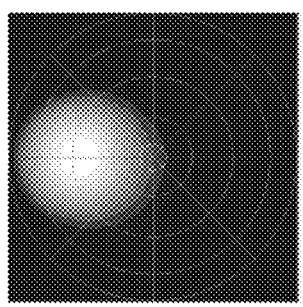
Figure 16E:
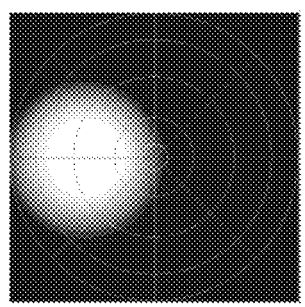
Figure 16F:
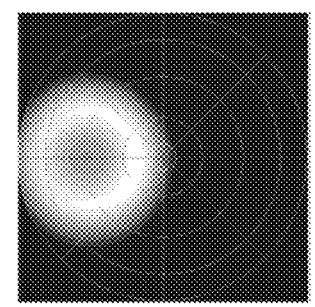
Figure 16G:
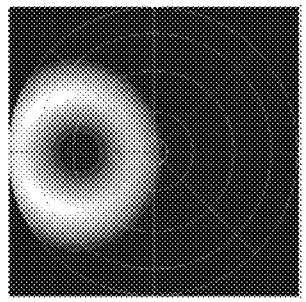

FIG. 15(a) is a schematic diagram of a cross-section obtained by cutting the optical diffusion film thus obtained, at a plane that was parallel to the direction of movement of the coating layer and orthogonally intersected the film plane. FIG. 15(b) is a photograph of the cross-section.

As illustrated in FIG. 15(a), the length L1 of the first columnar structure was 143 μm, and the angle of inclination θa was 19°. Meanwhile, the pillar-shaped objects that constituted such a first columnar structure did not have a bent section.

Furthermore, the length L2 of the second columnar structure was 69.8 μm, and the angle of inclination θc was 0°.

Moreover, there existed an overlapping columnar structure (overlapping internal structure) in which the tips of pillar-shaped objects originating from the second columnar structure were brought into contact with the vicinity of the tips of pillar-shaped objects originating from the first columnar structure, and the length L3 was 14.8 μm.

The absolute value of θa−θc in the overlapping internal structure was 19°.

The optical diffusion characteristics of the optical diffusion film thus obtained were evaluated in the same manner as in Example 1. Conoscopic images thus obtained are presented in FIGS. 16(a) to 16(g).

From the results, since diffusion of the incident light occurred even in a case in which the incident angle θ2 of the incident light was varied from 0° to 60°, it is understood that the optical diffusion film has a wide optical diffusion incident angle region including at least from 0° to 60°.

However, the shape or intensity distribution of the diffused light noticeably varied depending on the incident angle, and for example, when θ2 was 50° or 60°, crescent-shaped diffusion with a fine width or ring-shaped diffusion occurred, or when θ2 was 20° or 30°, circular-shaped diffusion with a small radius occurred.

Therefore, it is understood that changes in the optical diffusion characteristics associated with variation in the incident angle may not be effectively suppressed.

Comparative Example 2

In Comparative Example 2, an optical diffusion film was manufactured in the same manner as in Example 1, except that when the composition for an optical diffusion film was manufactured, an ultraviolet absorber as the component (D) was not added, the angle of irradiation θ1 as illustrated in FIG. 7 for the first irradiation with ultraviolet radiation was almost 40°, the peak illuminance was 1.26 mW/cm$^2$, and the cumulative amount of light was 31.7 mJ/cm$^2$. The results thus obtained are presented in FIGS. 17(a) and 17(b).

Figure 17A:
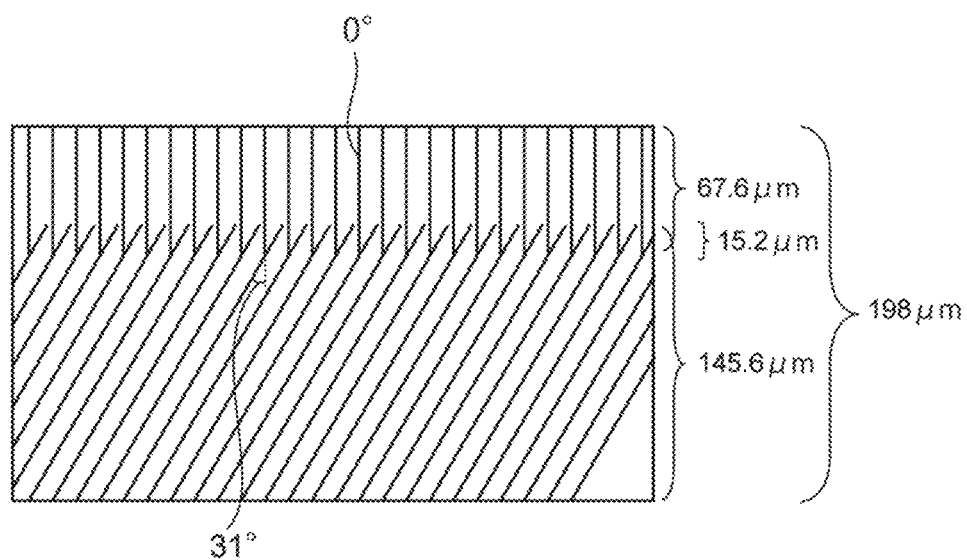
FIGS. 17(a) and 17(b) are a schematic diagram and a photograph of a cross-section of the optical diffusion film of Comparative Example 2.
Figure 17B:
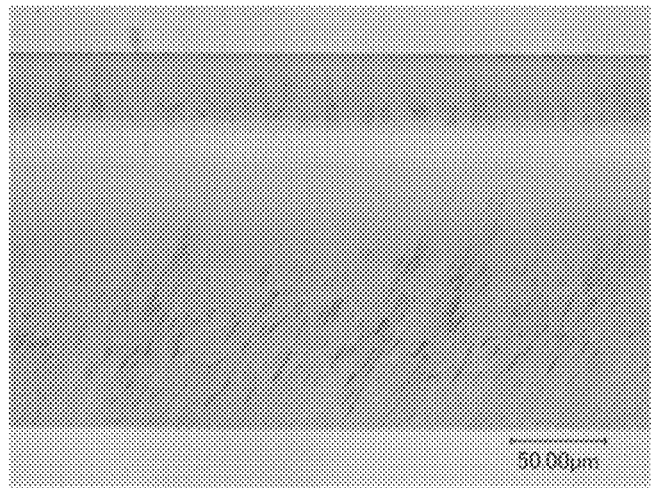
Figure 18A:
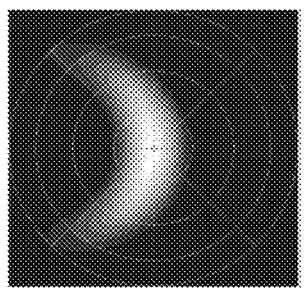
FIGS. 18(a) to 18(g) are diagrams provided to explain the optical diffusion characteristics of the optical diffusion film of Comparative Example 2.
Figure 18B:
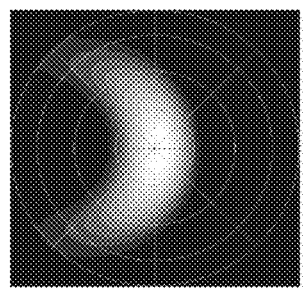
Figure 18C:
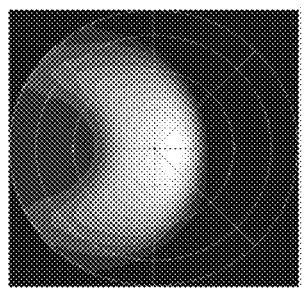
Figure 18D:
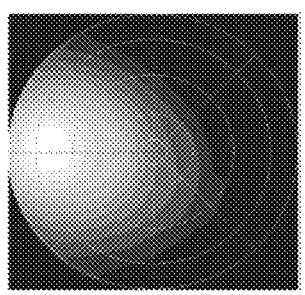
Figure 18E:
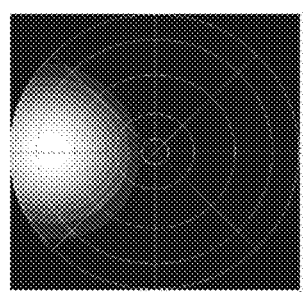
Figure 18F:
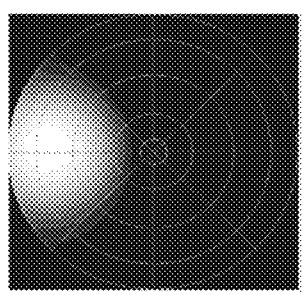
Figure 18G:
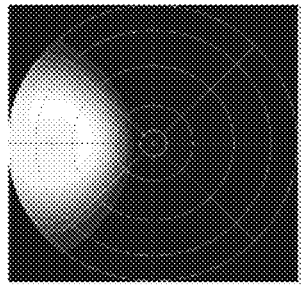

FIG. 17(a) is a schematic diagram of a cross-section obtained by cutting the optical diffusion film thus obtained, at a plane that was parallel to the direction of movement of the coating layer and orthogonally intersected the film plane, and FIG. 17(b) is a photograph of the cross-section.

As illustrated in FIG. 17(a), the length L1 of the first columnar structure was 145.6 μm, and the angle of inclination θa was 31°. Meanwhile, the pillar-shaped objects that constituted such a first columnar structure did not have a bent section.

Furthermore, the length L2 of the second columnar structure was 67.6 μm, and the angle of inclination θc was 0°.

Moreover, there existed an overlapping columnar structure (overlapping internal structure) in which the tips of pillar-shaped objects originating from the second columnar structure were brought into contact with the vicinity of the tips of pillar-shaped objects originating from the first columnar structure, and the length L3 was 15.2 μm.

The absolute value of θa−θc in the overlapping internal structure was 31°.

The optical diffusion characteristics of the optical diffusion film thus obtained were evaluated in the same manner as in Example 1. Conoscopic images thus obtained are presented in FIGS. 18(a) to 18(g).

From the results, since diffusion of the incident light occurred even in a case in which the incident angle θ2 of the incident light was varied from 0° to 60°, it is understood that the optical diffusion film has a wide optical diffusion incident angle region including at least from 0° to 60°.

However, the shape or intensity distribution of the diffused light noticeably varied depending on the incident angle, and for example, when θ2 was 30°, 40°, or 50°, circular-shaped diffusion with a small radius occurred.

Therefore, it is understood that changes in the optical diffusion characteristics associated with variation in the incident angle may not be effectively suppressed.

Comparative Example 3

In Comparative Example 3, an optical diffusion film was manufactured in the same manner as in Example 3, except that when a composition for an optical diffusion film was manufactured, an ultraviolet absorber as the component (D) was not added, and the film thickness of the optical diffusion film was adjusted to 196 μm. The results thus obtained are presented in FIGS. 19(a) and 19(b).

Figure 19A:
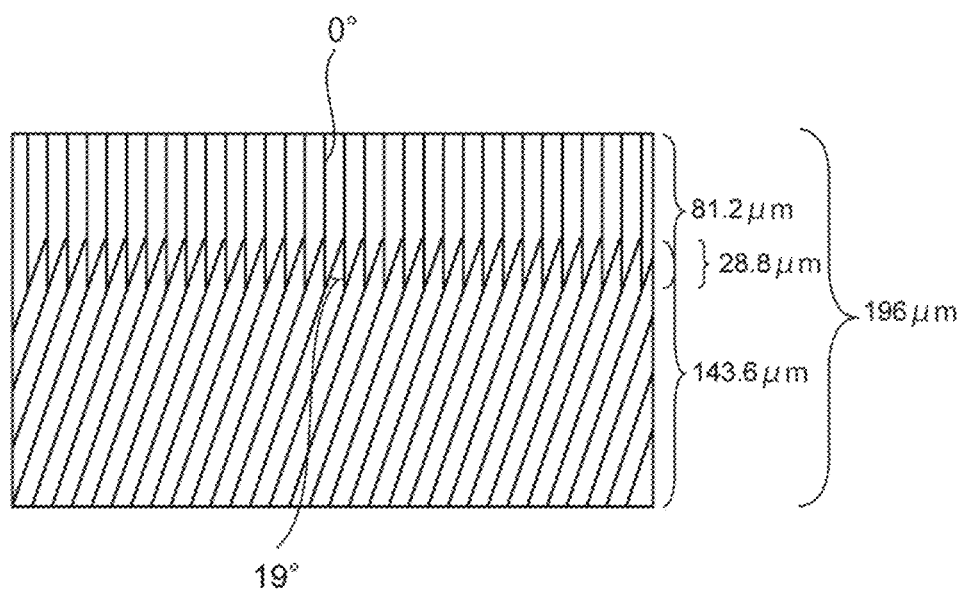
FIGS. 19(a) and 19(b) are a schematic diagram and a photograph of a cross-section of the optical diffusion film of Comparative Example 3.
Figure 19B:
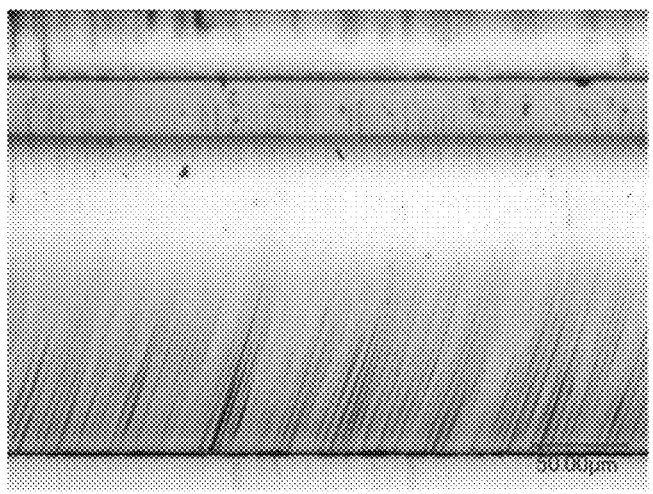
Figure 20A:
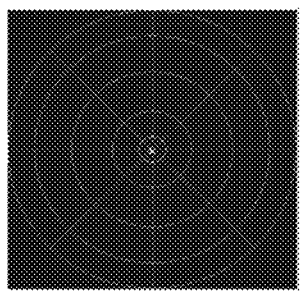
FIGS. 20(a) to 20(g) are diagrams provided to explain the optical diffusion characteristics of the optical diffusion film of Comparative Example 3.
Figure 20B:
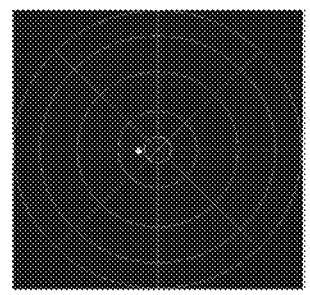
Figure 20C:
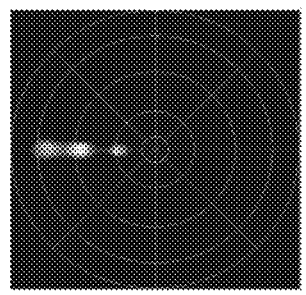
Figure 20D:
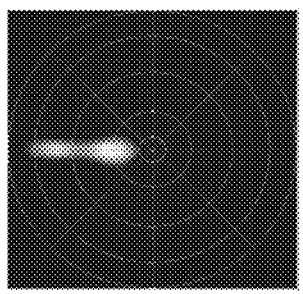
Figure 20E:
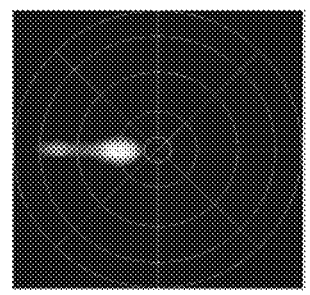
Figure 20F:
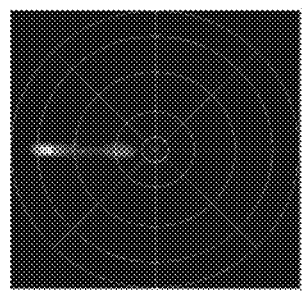
Figure 20G:
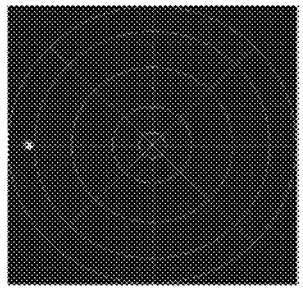
Figure 21A:
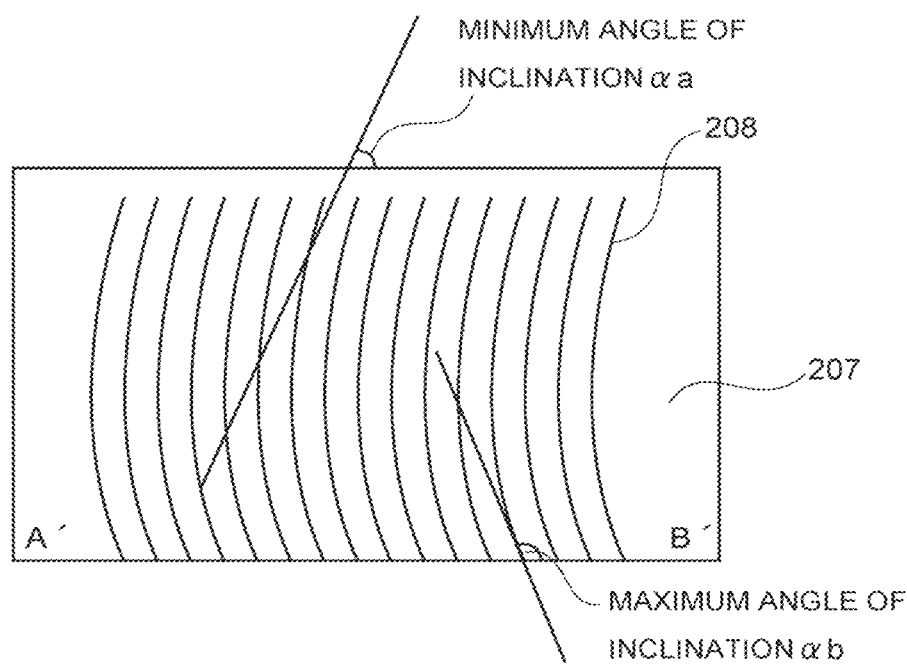
FIGS. 21(a) and 21(b) are diagrams provided to explain a conventional optical diffusion film.
Figure 21B:
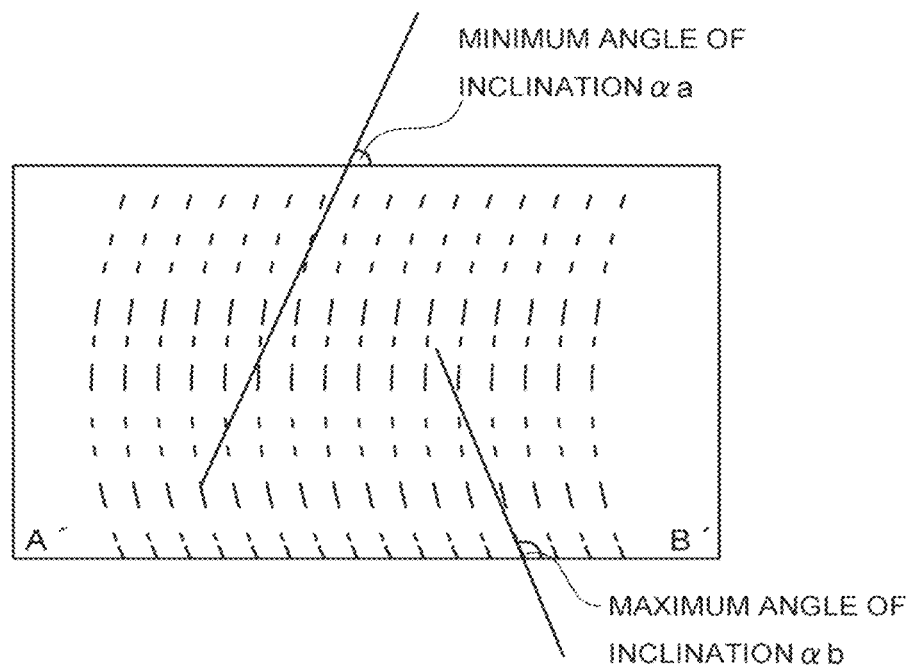
Figure 22:
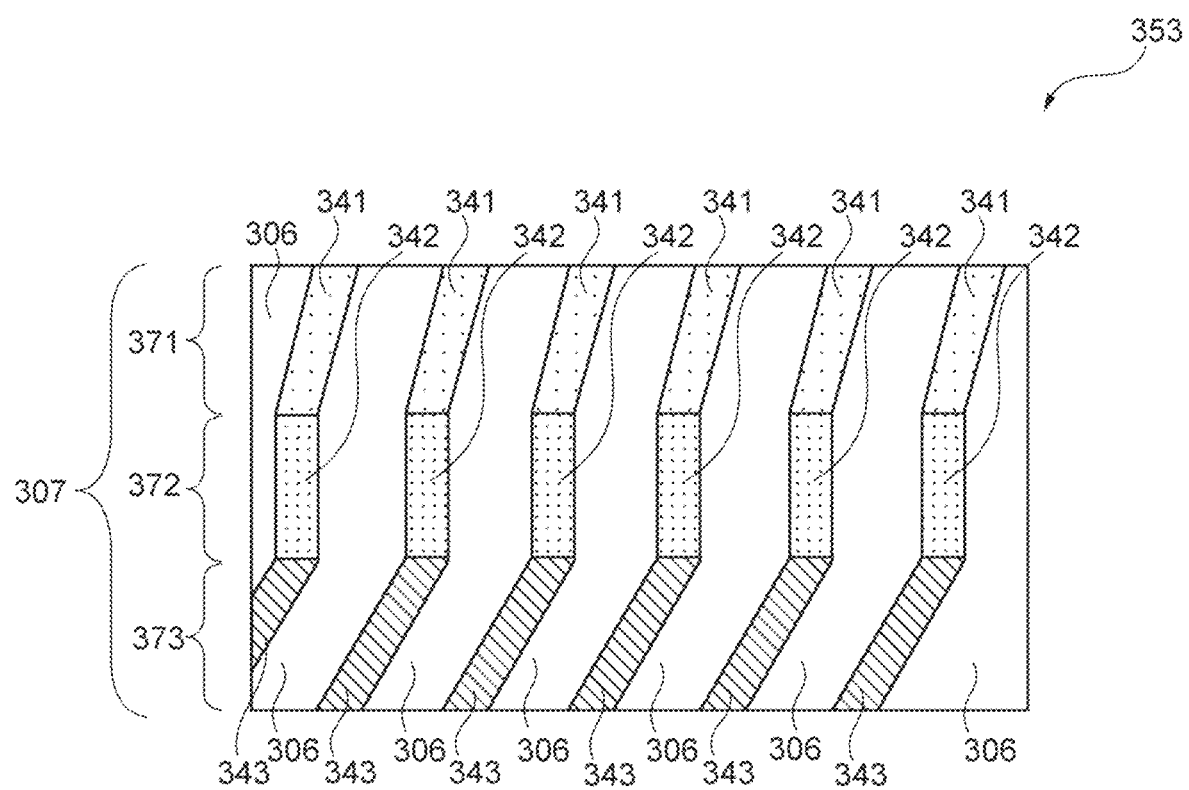
FIG. 22 is another diagram provided to explain a conventional optical diffusion film.
Figure 23A:
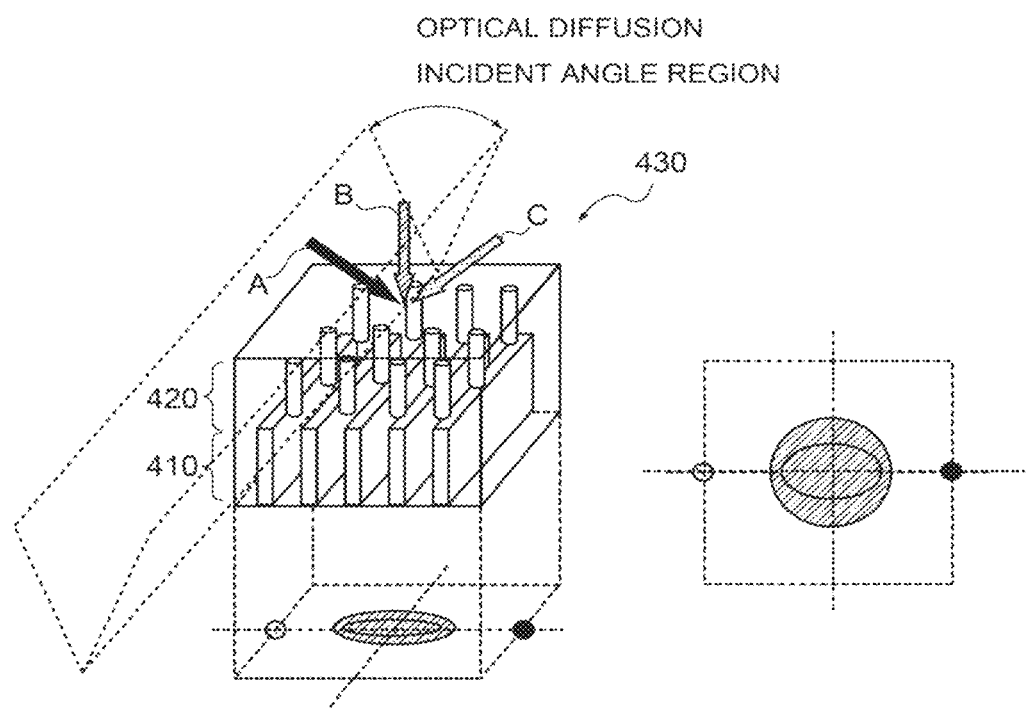
FIGS. 23(a) and 23(b) are still other diagrams provided to explain a conventional optical diffusion film.
Figure 23B:
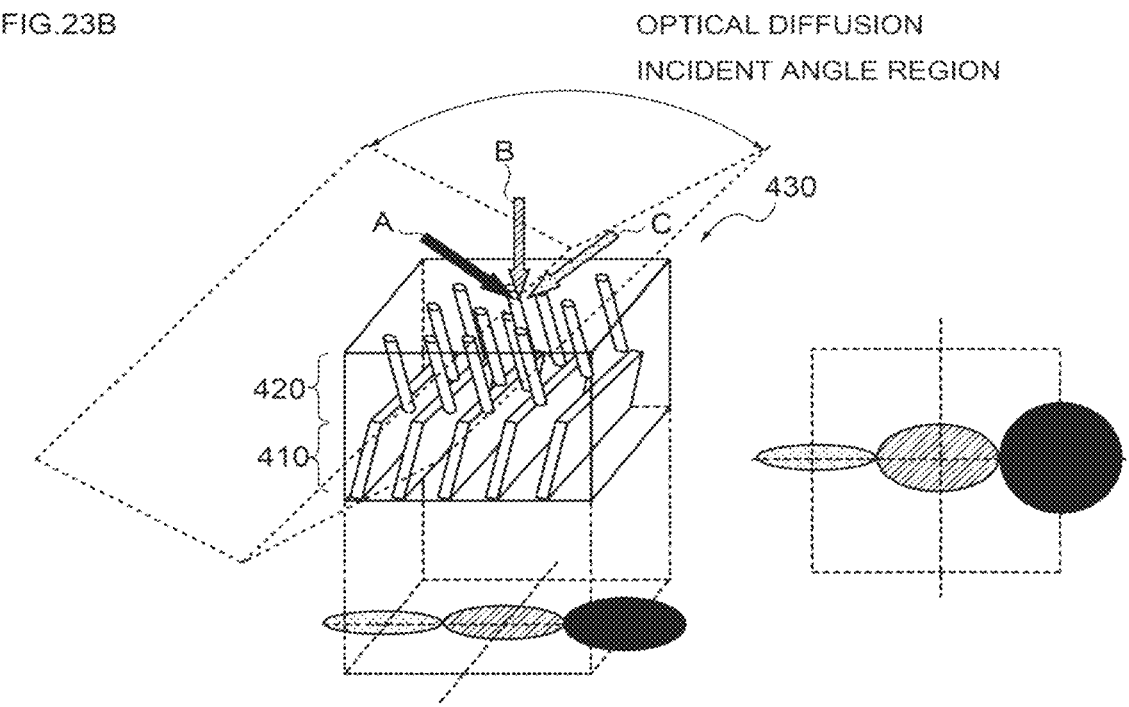
Figure 24A:
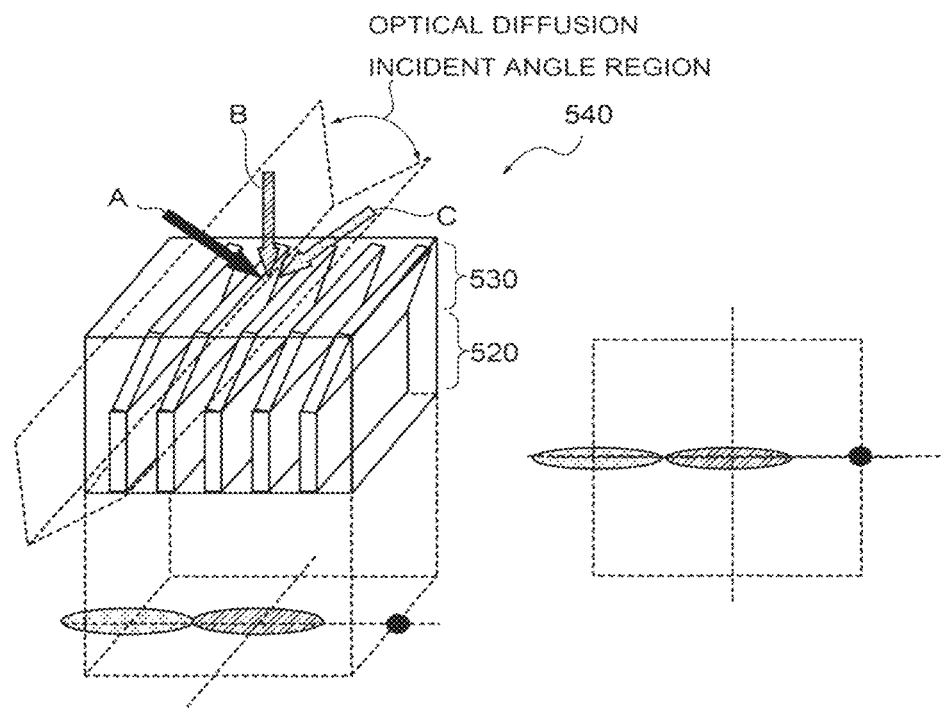
FIGS. 24(a) and 24(b) are still other diagrams provided to explain a conventional optical diffusion film.
Figure 24B:
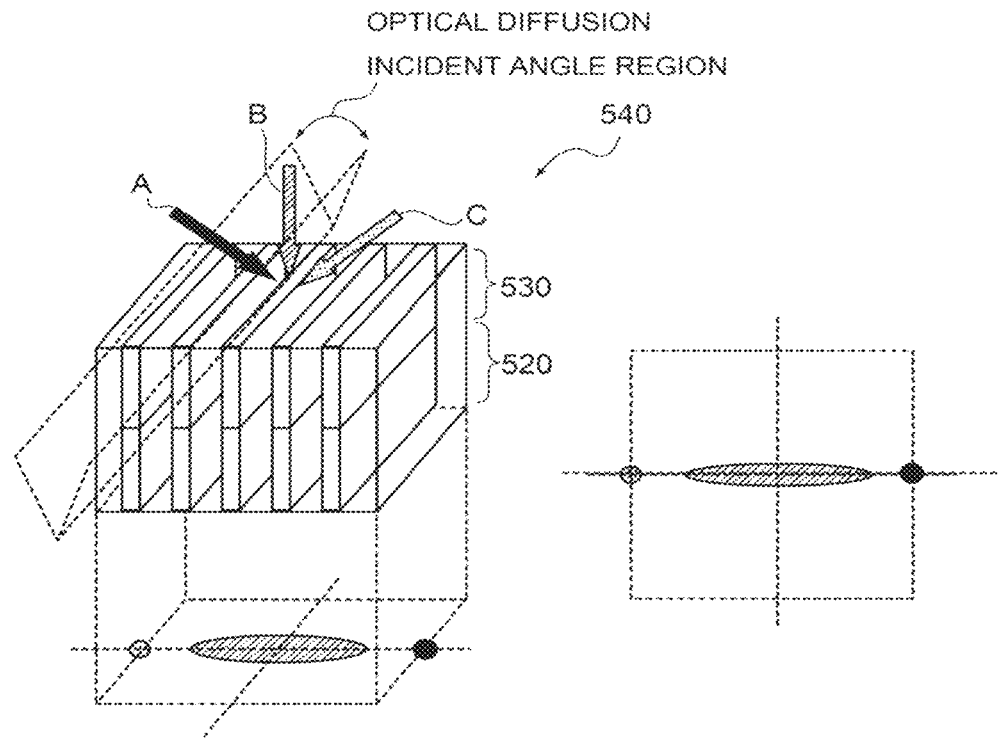

FIG. 19(a) is a schematic diagram of a cross-section obtained by cutting the optical diffusion film thus obtained, at a plane that was parallel to the direction of movement of the coating layer and orthogonally intersected the film plane, and FIG. 19(b) is a photograph of the cross-section.

As illustrated in FIG. 19(a), the length L1 of the first louver structure was 143.6 μm, and the angle of inclination θa was 19°. Meanwhile, the high refractive index plate-shaped regions that constituted such a first louver structure did not have a bent section.

Furthermore, the length L2 of the second louver structure was 81.2 μm, and the angle of inclination θc was 0°.

Moreover, there existed an overlapping louver structure (overlapping internal structure) in which the tips of high refractive index plate-shaped regions originating from the second louver structure were brought into contact with the vicinity of the tips of high refractive index plate-shaped regions originating from the first louver structure, and the length L3 was 28.8 μm.

The absolute value of θa−θc in the overlapping internal structure was 19°.

The optical diffusion characteristics of the optical diffusion film thus obtained were evaluated in the same manner as in Example 3. Conoscopic images thus obtained are presented in FIGS. 20(a) to 20(g).

From the results, since diffusion of the incident light occurred even in a case in which the incident angle θ2 of the incident light was varied from 0° to 40°, it is understood that the optical diffusion film has a wide optical diffusion incident angle region including at least from 0° to 40°.

However, the intensity distribution of diffused light noticeably changes depending on the incident angle, and for example, when θ2 was 30° or 40°, diffused light is not observed from the film front.

Furthermore, diffusion occurring when θ2 was 0° was markedly decreased, and most of light was transmitted.

Therefore, it is understood that changes in the optical diffusion characteristics associated with variation in the incident angle may not be effectively suppressed.

INDUSTRIAL APPLICABILITY

As described above, according to the invention, when a first internal structure and a second internal structure are formed in a film, and also, a bent section is provided in at least those regions having a relatively high refractive index, which constitute the first internal structure, the optical diffusion incident angle region can be effectively expanded, and even in a case in which the incident angle of incident light is varied within the optical diffusion incident angle region, changes in the optical diffusion characteristics can be effectively suppressed.

Therefore, the optical diffusion film or the like of the invention can be applied to a light control film in a refractive liquid crystal display devices, as well as to a viewing angle control film, a viewing angle expanding film, and a projection screen, and is expected to significantly contribute to quality improvement of these products.

REFERENCE NUMERALS

1: Coating layer
2: Process sheet
10: Optical diffusion film
11: Low refractive index region
12: High refractive index region in first internal structure
12a: Pillar-shaped object in first internal structure
12b: High refractive index plate-shaped region in first internal structure
12': High refractive index region in second internal structure
12a': Pillar-shaped object in second internal structure
12b': High refractive index plate-shaped region in second internal structure
14: Bent section
20: first internal structure
20a: Columnar structure as first internal structure (bent columnar structure)
20b: Louver structure as first internal structure (bent louver structure)
30: Second internal structure
30a: Columnar structure as second internal structure
30b: Louver structure as second internal structure
40: Overlapping internal structure
50: Optical diffusion layer
60: Parallel light
70: Light radiated from point light source
70': Light radiated from linear light source
102: Point light source
104: Lens
125: Linear light source

What is claimed is:

1. An optical diffusion film comprising, inside the film, a single optical diffusion layer having a first internal structure and a second internal structure, each of the internal structures including a plurality of regions having a relatively high refractive index in a region having a relatively low refractive index, sequentially from the lower part along the film thickness direction,
wherein the first internal structure and the second internal structure are both louver structure in which a plurality of plate-shaped regions having different refractive indices are alternately disposed in any one direction along the film plane,
wherein the regions having a relatively high refractive index in the first internal structure have a bent section at an intermediate point along the film thickness direction,
wherein in the first internal structure, the angle of inclination θa, with respect to the normal line of the film plane, of the regions having a relatively high refractive index in the portion upper than the bent section is adjusted to a value within the range of 0° to 30°, and the angle of inclination θb, with respect to the normal line of the film plane, of the regions having a relatively high refractive index in the portion lower than the bent section is adjusted to a value within the range of 1° to 60°, and
wherein the absolute value of θb−θa is adjusted to a value within the range of 1° to 30° or less.

2. The optical diffusion film according to claim 1, wherein in the first internal structure, the length La of the regions having a relatively high refractive index in the portion upper than the bent section is adjusted to a value within the range of 15 to 475 μm, and the length Lb of the regions having a relatively high refractive index in the portion lower than the bent section is adjusted to a value within the range of 15 to 475 μm.

3. The optical diffusion film according to claim 1, wherein the optical diffusion film has an overlapping internal structure in which the position of the upper end of the first internal structure and the position of the lower end of the second internal structure overlap with each other in the film thickness direction.

4. The optical diffusion film according to claim 3, wherein the overlapping internal structure is an overlapping internal structure in which the tips of the regions having a relatively high refractive index, which originate from any one of the first internal structure and the second internal structure, are in contact with the vicinity of the tips of the regions having a relatively high refractive index, which originate from the other internal structure; or an overlapping internal structure in which the regions having a relatively high refractive index, which respectively originate from the first internal structure and the second internal structure, overlap in a non-contact state.

5. The optical diffusion film according to claim 3, wherein the thickness of the overlapping internal structure is adjusted to a value within the range of 1 to 40 μm.

6. A method for manufacturing an optical diffusion film according to claim 1, the method comprising the following steps (a) to (d):
(a) a step of preparing a composition for an optical diffusion film including at least two polymerizable compounds having different refractive indices, a photopolymerization initiator and an ultraviolet absorber, in which the content of the ultraviolet absorber is adjusted to a value of below 2 parts by weight (provided that 0 parts by weight is excluded) relative to the total amount (100 parts by weight) of the at least two polymerizable compounds having different refractive indices;

(b) a step of applying the composition for an optical diffusion film on a process sheet, and forming a coating layer;

(c) a step of subjecting the coating layer to first irradiation with active energy radiation to form a louver structure as a first internal structure formed by bending an intermediate point along a film thickness of a region having a relatively high refractive index in the lower portion of the coating layer with the ultraviolet absorber, and also leaving a region where an internal structure is not formed, in the upper portion of the coating layer; and (d) a step of subjecting the coating layer to second irradiation with active energy radiation to form a louver structure as a second internal structure in the region where an internal structure is not formed.

7. The method for manufacturing an optical diffusion film according to claim 6, wherein the first irradiation with active energy radiation is performed in an oxygen-containing atmosphere, while the second irradiation with active energy radiation is performed in a non-oxygen atmosphere.

8. An optical diffusion film comprising, inside the film, a single optical diffusion layer having a first internal structure and a second internal structure, each of the internal structures including a plurality of regions having a relatively high refractive index in a region having a relatively low refractive index, sequentially from the lower part along the film thickness direction, wherein the first internal structure is a louver structure in which a plurality of plate-shaped regions having different refractive indices are alternately disposed in any one direction along the film plane, wherein the second internal structure is a columnar structure in which a plurality of pillar-shaped objects having a relatively high refractive index are arranged to stand close together in the film thickness direction in a region having a relatively low refractive index, wherein the regions having a relatively high refractive index in the first internal structure have a bent section at an intermediate point along the film thickness direction, wherein in the first internal structure, the angle of inclination $\theta a$, with respect to the normal line of the film plane, of the regions having a relatively high refractive index in the portion upper than the bent section is adjusted to a value within the range of 0° to 30°, and the angle of inclination $\theta b$, with respect to the normal line of the film plane, of the regions having a relatively high refractive index in the portion lower than the bent section is adjusted to a value within the range of 1° to 60°, and wherein the absolute value of $\theta b - \theta a$ is adjusted to a value within the range of 1° to 30° or less.

9. A method for manufacturing an optical diffusion film according to claim 8, the method comprising the following steps (a) to (d):

(a) a step of preparing a composition for an optical diffusion film including at least two polymerizable compounds having different refractive indices, a photopolymerization initiator and an ultraviolet absorber, in which the content of the ultraviolet absorber is adjusted to a value of below 2 parts by weight (provided that 0 parts by weight is excluded) relative to the total amount (100 parts by weight) of the at least two polymerizable compounds having different refractive indices;

(b) a step of applying the composition for an optical diffusion film on a process sheet, and forming a coating layer;

(c) a step of subjecting the coating layer to first irradiation with active energy radiation to form a louver structure as a first internal structure formed by bending an intermediate point along a film thickness of a region having a relatively high refractive index in the lower portion of the coating layer with the ultraviolet absorber, and also leaving a region where an internal structure is not formed, in the upper portion of the coating layer; and (d) a step of subjecting the coating layer to second irradiation with active energy radiation to form a columnar structure as a second internal structure in the region where an internal structure is not formed.

10. The method for manufacturing an optical diffusion film according to claim 9, wherein the first irradiation with active energy radiation is performed in an oxygen-containing atmosphere, while the second irradiation with active energy radiation is performed in a non-oxygen atmosphere.

\* \* \* \* \*